(12) United States Patent
Lim et al.

(10) Patent No.: US 9,977,288 B2
(45) Date of Patent: May 22, 2018

(54) LIQUID CRYSTAL DISPLAY

(71) Applicant: Samsung Display Co., Ltd., Yongin, Gyeonggi-Do (KR)

(72) Inventors: Ho Lim, Suwon-si (KR); Min Su Kim, Seoul (KR); Sung-Yi Kim, Seongnam-si (KR); Tae Min Kim, Seoul (KR); Tae Hoon Kim, Suwon-si (KR); Yi Seul Song, Uiwang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 506 days.

(21) Appl. No.: 14/514,694

(22) Filed: Oct. 15, 2014

(65) Prior Publication Data

US 2015/0293408 A1    Oct. 15, 2015

(30) Foreign Application Priority Data

Apr. 14, 2014 (KR) ........................ 10-2014-0044403

(51) Int. Cl.
*C09K 19/00* (2006.01)
*G02F 1/1337* (2006.01)

(52) U.S. Cl.
CPC .. *G02F 1/133711* (2013.01); *G02F 1/133788* (2013.01); *G02F 2001/133726* (2013.01); *G02F 2001/133742* (2013.01); *Y10T 428/10* (2015.01); *Y10T 428/1005* (2015.01)

(58) Field of Classification Search
CPC ......... G02F 1/133711; G02F 1/134309; G02F 1/133723; G02F 1/133788; G02F 2001/133726; G02F 2001/133742; C08G 73/10; C08G 73/1007; C08G 73/1025; Y10T 428/10; Y10T 428/10005; Y10T 428/1018; Y10T 428/1023
USPC ........ 428/1.1, 1.2, 1.25, 1.26; 349/123, 127, 349/130, 187; 528/353
See application file for complete search history.

(56) References Cited

U.S. PATENT DOCUMENTS

| | | | |
|---|---|---|---|
| 8,558,973 B2 | 10/2013 | Su et al. | |
| 2012/0229744 A1 | 9/2012 | Hattori et al. | |
| 2013/0101755 A1* | 4/2013 | Lee ................... | G02F 1/133707 428/1.23 |

FOREIGN PATENT DOCUMENTS

| | | |
|---|---|---|
| JP | 2011-207786 A | 10/2011 |
| JP | 2013-242526 A | 12/2013 |
| KR | 10-0936868 B1 | 1/2010 |
| KR | 1020130125772 A | 11/2013 |

* cited by examiner

*Primary Examiner* — Ruiyun Zhang
(74) *Attorney, Agent, or Firm* — Cantor Colburn LLP

(57) ABSTRACT

A liquid crystal display includes: a first insulating substrate, a second insulating substrate, a pixel electrode positioned on the first insulating substrate, a common electrode positioned on the first insulating substrate or the second insulating substrate, a first alignment layer positioned on the first insulating substrate, a second alignment layer positioned on the second insulating substrate, and a liquid crystal layer positioned between the first insulating substrate and the second insulating substrate. The first alignment layer and/or the second alignment layer include an additive and an alignment layer compound having a main chain, and a plurality of side chains connected to the main chain, and at least one of the plurality of side chains includes a vertical alignment group, and a reactive mesogen including two or more photoreactive groups.

6 Claims, 13 Drawing Sheets

LIQUID CRYSTAL DISPLAY

This application claims priority to and the benefit of Korean Patent Application No. 10-2014-0044403 filed on Apr. 14, 2014, and all the benefits accruing therefrom under 35 U.S.C. § 119, the content of which in its entirety is herein incorporated by reference.

BACKGROUND (a) Field

The present invention relates to a liquid crystal display.

(b) Description of the Related Art

A liquid crystal display is one of the most common types of flat panel displays currently in use, and includes two display panels with field generating electrodes such as a pixel electrode and a common electrode, and a liquid crystal layer interposed therebetween. The liquid crystal display displays an image by applying a voltage to a field generating electrode to generate an electric field on the liquid crystal layer, determining the direction of liquid crystal molecules of the liquid crystal layer, and controlling polarization of incident light.

Among the liquid crystal displays, a vertically aligned ("VA") mode liquid crystal display in which long axes of the liquid crystal molecules are arranged to be vertical to the upper and lower display panels when an electric field is not applied, comes into the spotlight because the contrast ratio of the VA mode liquid crystal display is large and it is easy to implement a wide standard viewing angle.

In the VA mode liquid crystal display, a plurality of domains in which alignment directions of the liquid crystals are different from each other, may be formed in one pixel in order to implement the wide viewing angle. Methods such as forming of a cutout such as a fine slit, or forming of a protrusion on the field generating electrode, are used as means for forming a plurality of domains. In this method, the liquid crystals are aligned in a direction that is vertical to a fringe field by the fringe field formed between an edge of the cutout or the protrusion and the field generating electrode facing the edge, and thus a plurality of domains may be formed.

However, the VA mode liquid crystal display has poor lateral surface visibility as compared to front surface visibility.

SUMMARY

The present invention has been made in an effort to provide a display device where mechanical properties of an alignment layer are improved.

In exemplary embodiments, a liquid crystal display includes: a first insulating substrate, a second insulating substrate facing the first insulating substrate, a pixel electrode positioned on the first insulating substrate, a common electrode positioned on the first insulating substrate or the second insulating substrate, a first alignment layer positioned on the first insulating substrate, a second alignment layer positioned on the second insulating substrate, and a liquid crystal layer positioned between the first insulating substrate and the second insulating substrate, in which at least one of the first alignment layer and the second alignment layer includes an alignment material polymer and an additive, and the alignment material polymer includes a main chain and a plurality of side chains in which at least one of the plurality of side chains includes a vertical alignment group, and a reactive mesogen ("RM") including two or more photoreactive groups, and the additive includes at least one compound selected from the following:

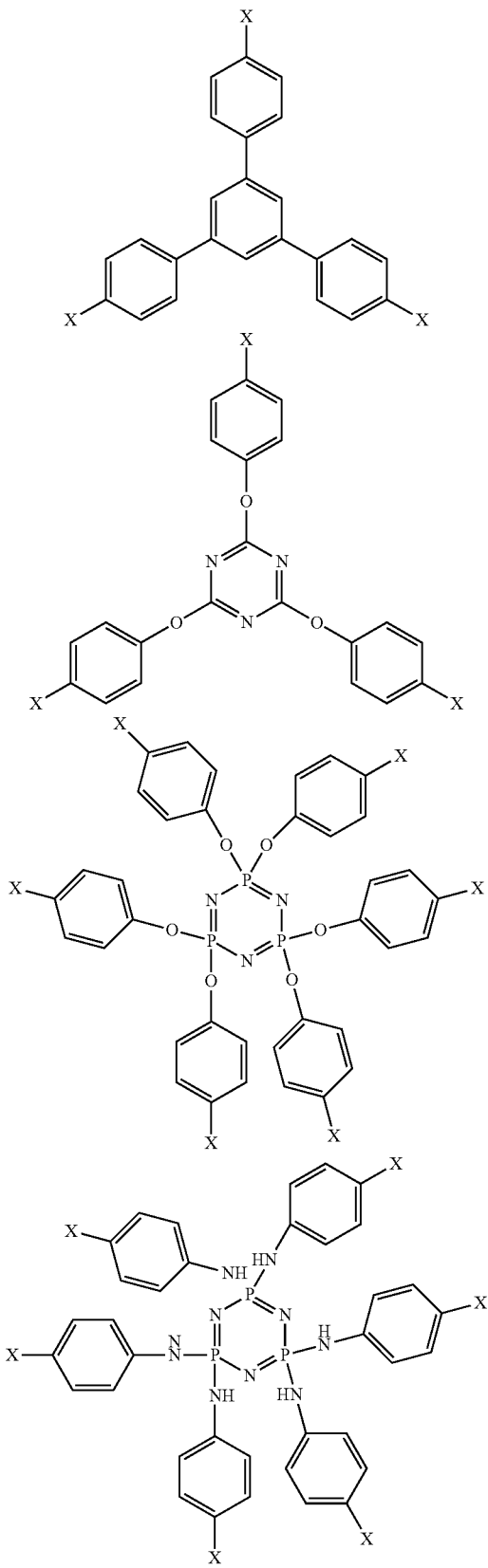

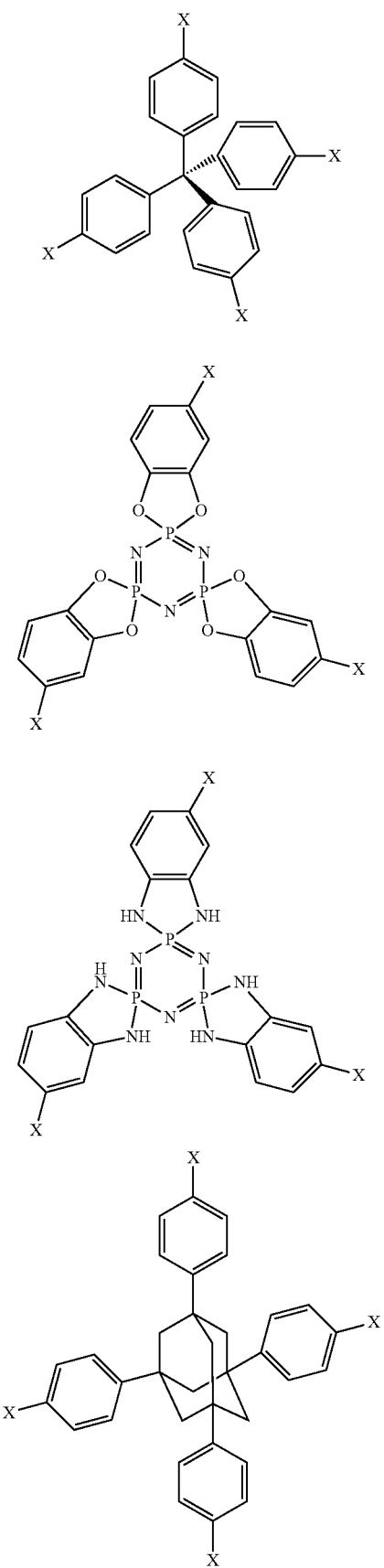
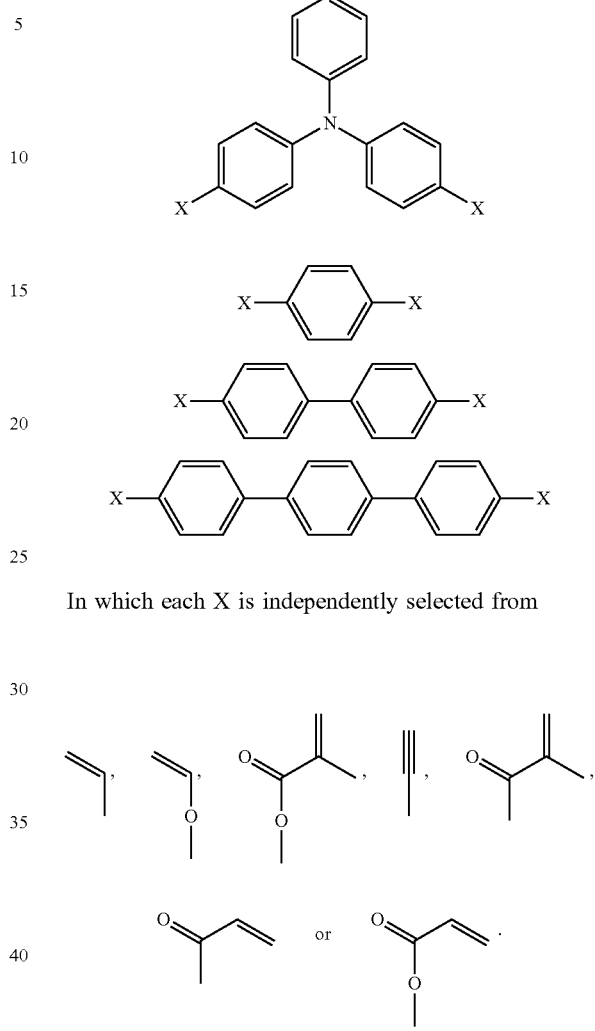
In which each X is independently selected from
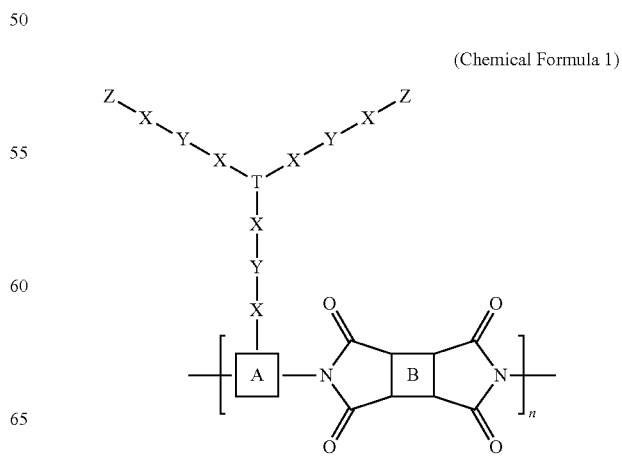
The alignment layer compound includes at least one compound represented by Chemical Formula 1 and Chemical Formula 2, in which Y or Z represents a photoreactive group:
(Chemical Formula 1)

(Chemical Formula 2)

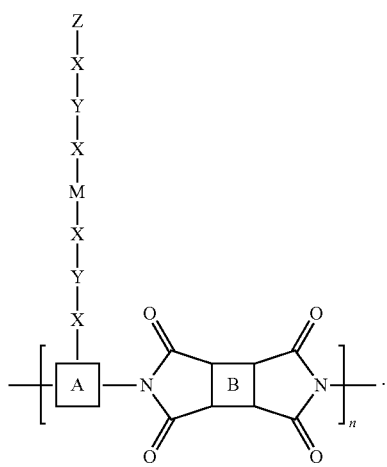

A is

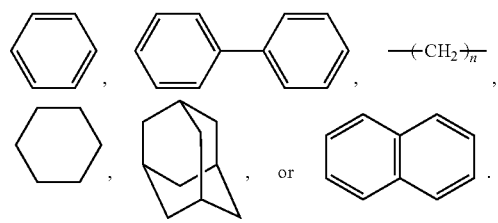

B is

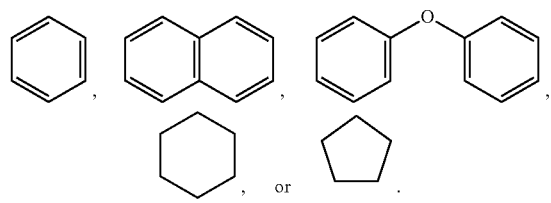

Each X is independently selected from

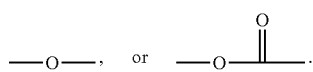

Each Y is independently selected from

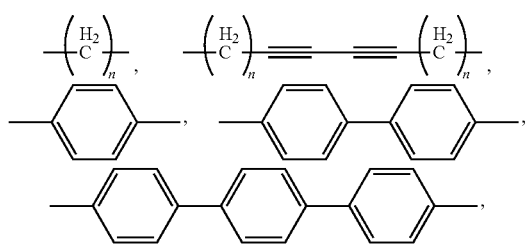

T is

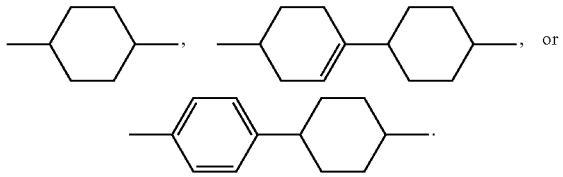

M is

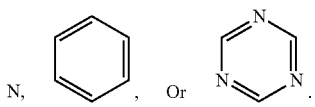 [SMILES: c1ccccc1 ; c1ncncn1]

Each Z is independently selected from

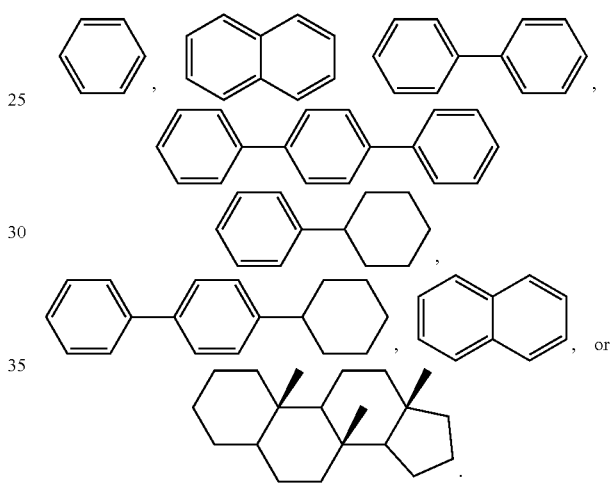

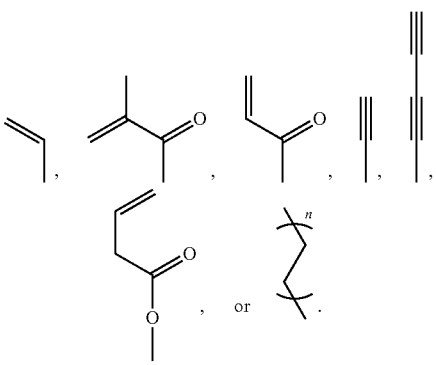

n is a natural number greater than or equal to 1.

The alignment layer compound includes a diamine compound and a dianhydride compound, and a mole ratio of the diamine compound to the dianhydride is 1:1.

A content of the additive is about 0.01 percent (%) to about 50% by weight based on a total weight of the first alignment layer or the second alignment layer.

The alignment layer compound includes a compound represented by the following Chemical Formula 3, in which VA represents the vertical alignment group, and RM represents the reactive mesogen.

(Chemical Formula 3)

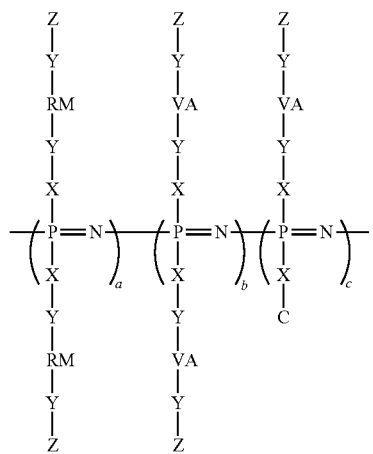

RM is selected from

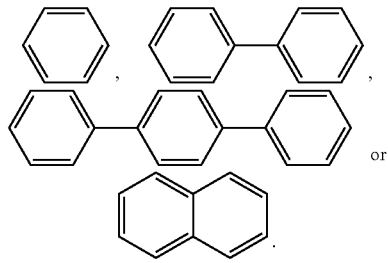

VA is selected from

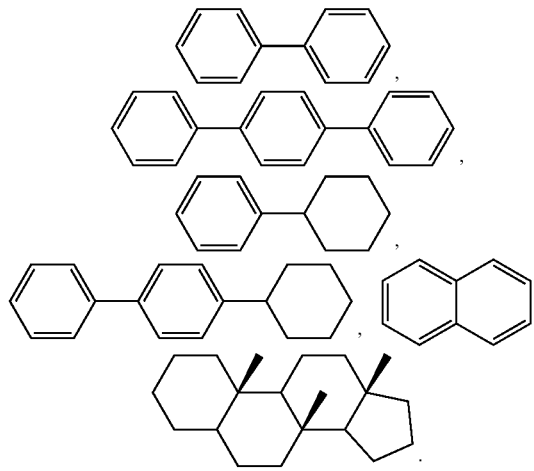

X is —NH$_2$ or —OH
Each Y is independently selected from

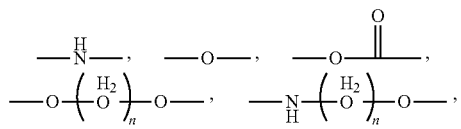

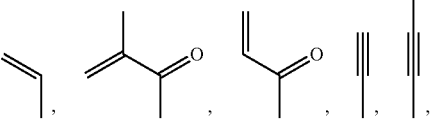

Z is

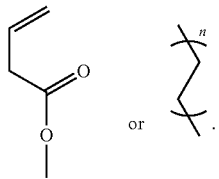

C is OH, —NH$_2$, trifluoroethyl, ethyl, propyl, t-butyl, butyl, and saturated/unsaturated hydrocarbons substituted by a plurality of halogens.

n is a natural number greater than or equal to 1; and a, b, and c may each have a value of 0 to 1, and a sum of a, b, and c may be 1.

The alignment layer compound is a compound represented by following Chemical Formula 4:

(Chemical Formula 4)

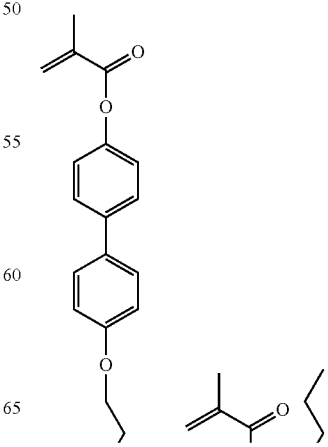

-continued

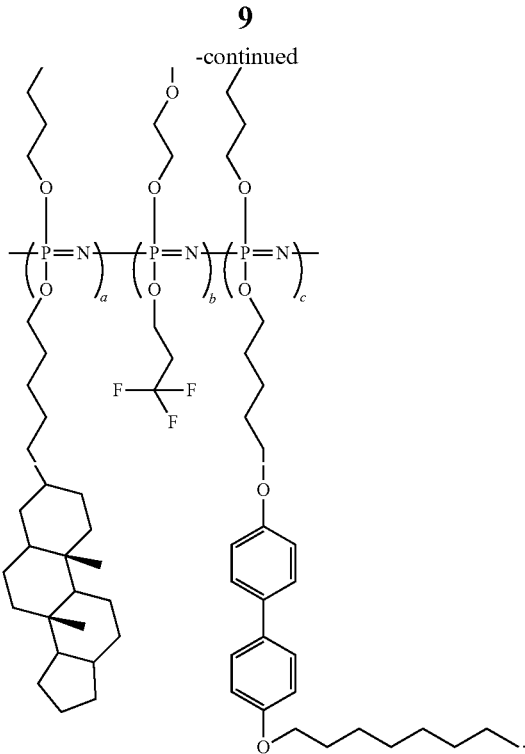

In the aforementioned liquid crystal display, it is possible to provide a display device in which the mechanical properties of the alignment layer and an afterimage of the display device are improved through the inclusion of a reactive mesogen having an increased number of photoreactive groups and an additive in the alignment layer.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
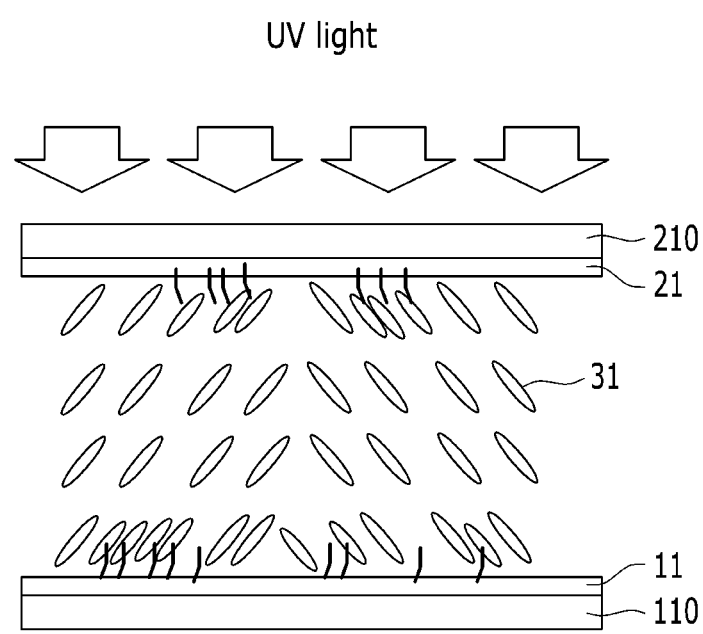
FIG. 1 is an illustration of a process of allowing liquid crystal molecules to have a pretilt by irradiating an exemplary embodiment of an alignment layer including a photoreactive group with ultraviolet ("UV") rays.

The present invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to increase response speed of the liquid crystal while implementing the wide viewing angle, methods of allowing a liquid crystal to have a pretilt in a state in which the electric field is not applied have been developed. To allow the liquid crystals to have the pretilts in several directions, an alignment layer having several alignment directions is used, or a reactive mesogen is added to the alignment layer or the liquid crystal layer and then light is irradiated to the alignment layer or the liquid crystal layer in the state in which the electric field is applied thereto, thereby forming the pretilt.

The vertically aligned ("VA") mode liquid crystal display has poor lateral surface visibility as compared to front surface visibility, and in order to solve this, a method of dividing one pixel into two sub-pixels and making voltages of the two sub-pixels different is proposed.

Meanwhile, in order to implement the wide viewing angle and increase a response speed of the liquid crystals, a method of allowing the liquid crystals to have a pretilt in a state where an electric field is not applied has been developed. In order to allow the liquid crystals to have the pretilt in various directions, the pretilt may be formed by using an alignment layer where alignment directions are various or adding a reactive mesogen to the alignment layer or the liquid crystal layer and then irradiating light in a state where the electric field is applied.

First, an alignment method of allowing liquid crystal molecules to have a pretilt will be described with reference to FIGS. 1 to 5.

Figure 2:
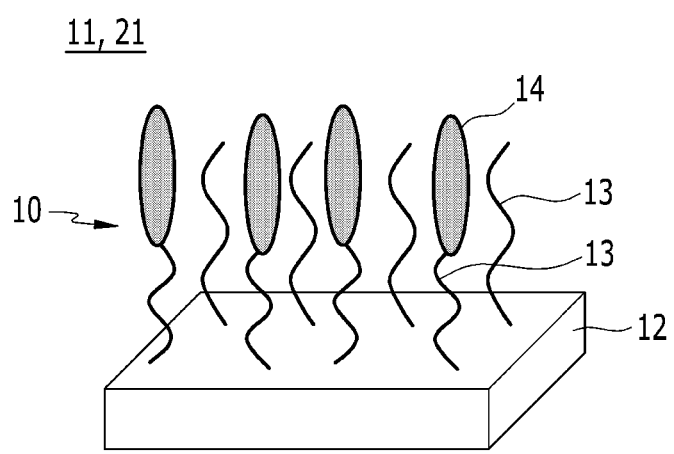
FIG. 2 is an illustration of the structure of an exemplary embodiment of an alignment layer.
Figure 3:
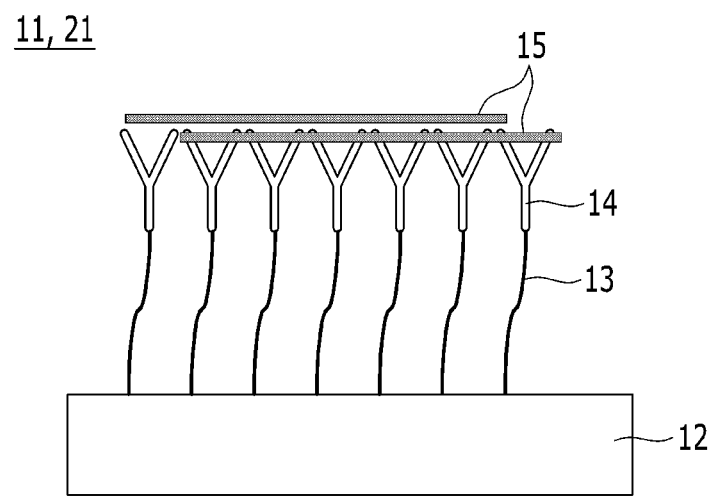
FIG. 3 is a schematic view of an exemplary reactive mesogen.
Figure 4:
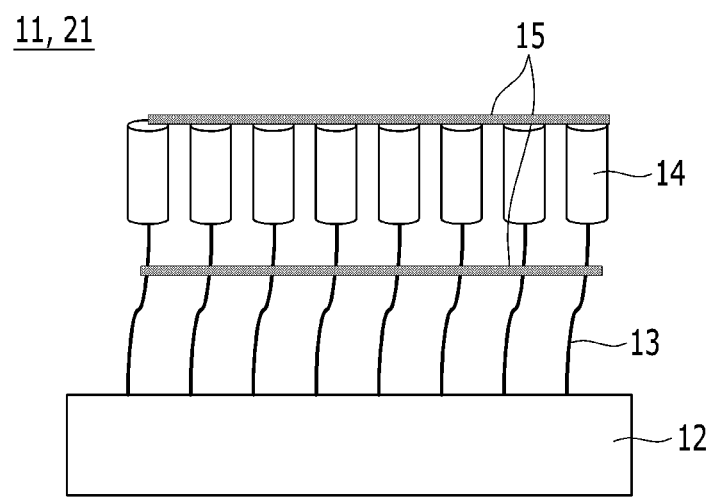
FIG. 4 is an additional schematic view of the exemplary reactive mesogen.
Figure 5:
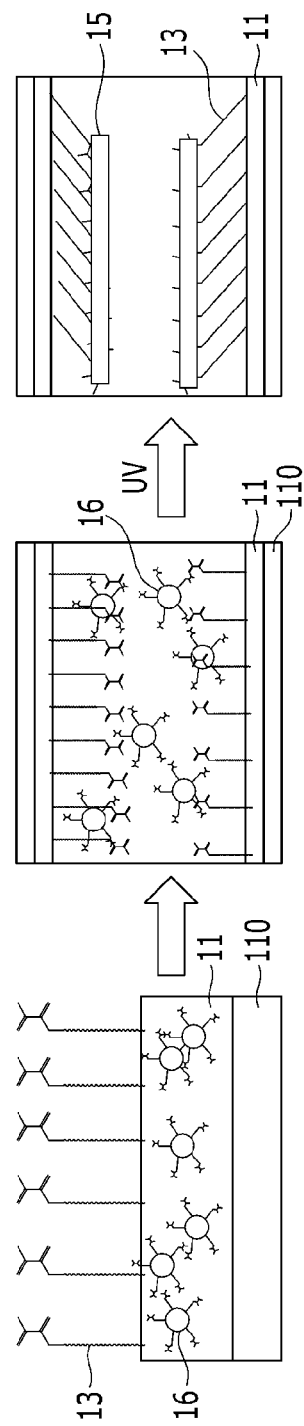
FIG. 5 is an illustration showing the process of allowing the liquid crystal molecules to have the pretilt by irradiating the exemplary alignment layer including an additive with UV rays.

FIG. 1 is a view illustrating a process of allowing the liquid crystal molecules 31 to have a pretilt by irradiating an alignment layer including a photoreactive group with ultraviolet ("UV") rays. FIG. 2 is a view illustrating the structure of an exemplary embodiment of an alignment layer. FIGS. 3 and 4 are schematic views of a reactive mesogen. FIG. 5 is a view illustrating a process of allowing the liquid crystal molecules to have the pretilt by irradiating an alignment layer including an additive with UV rays.

First, alignment layers 11 and 21 are formed on two substrates 110 and 210. In this case, the alignment layer includes an alignment layer compound including a main chain and a plurality of side chains connected to the main chain, and an additive 16.

The additive 16 is a material having a plurality of photoreactive groups. The additive 16 promotes a reaction between the reactive mesogens of the alignment layer compound, and increases the degree of cross-linking of the reactive mesogens. A detailed content thereof will be described later.

Referring to FIG. 2, each of the plurality of side chains may include a reactive mesogen 10 having two or more photoreactive groups 14, a vertical expression group 13, and the like. FIG. 2 illustrates the presence of one photoreactive group 14 in the reactive mesogen 10, however the actual number of photoreactive groups 14 is two or more.

Figure 11:
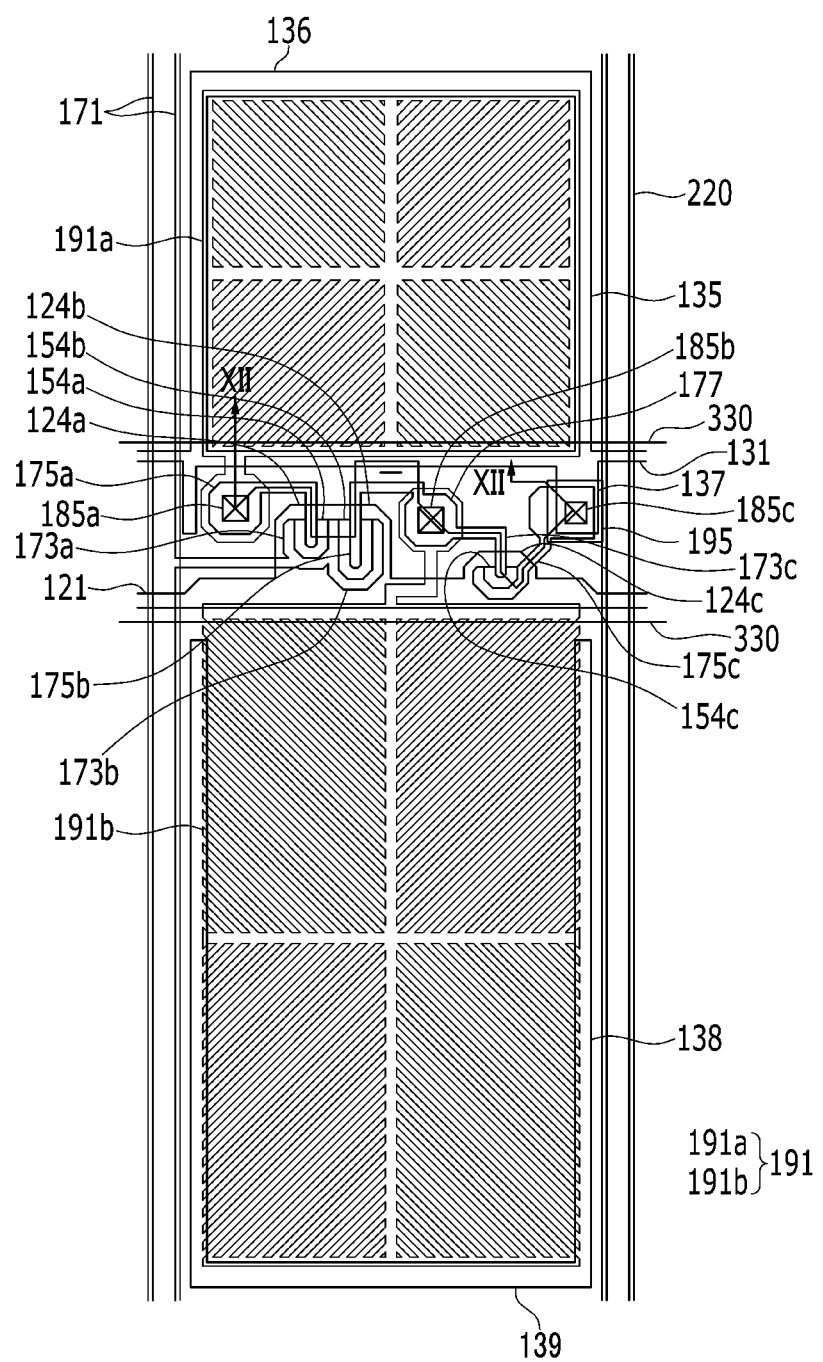
FIG. 11 is a plan view of one pixel in an exemplary embodiment of the liquid crystal display.

Once the alignment layers 11 and 21 are formed on the substrates 110 and 210, as illustrated in FIG. 11, a data voltage is applied to a first sub-pixel electrode 191*a* and a second sub-pixel electrode 191*b*, and a common voltage is applied to a common electrode 270 of an upper display panel 200 to generate an electric field in a liquid crystal layer 3 between the two display panels 100 and 200. Then, the liquid crystal molecules 31 of the liquid crystal layer 3 may respond to the electric field to be inclined in a direction that is parallel to length directions of fine branch portions 194*a*, 194*b*, 194*c*, and 194*d*. In this case, the total number of inclination directions of the liquid crystal molecules 31 in one pixel may be four.

If the electric field is generated in the liquid crystal layer 3 and light such as ultraviolet rays is then irradiated, the photoreactive groups 14 included in the reactive mesogens 10 are reacted with each other to form a cross-linking portion 15 as illustrated in FIGS. 3 and 4. The cross-linking portion 15 may have the pretilt.

In this case, referring to FIG. 5, the additive 16 included in the alignment layer of the present invention is dissolved out into liquid crystals to be reacted with the reactive mesogen of the alignment layer in a light irradiation process. The additive is a compound having the plurality of photoreactive groups, and the photoreactive groups of the additive are reacted with the photoreactive groups of the reactive mesogen to form the cross-linking portion 15. Accordingly, as compared to the case where the additive 16 is not present in the alignment layer, the degree of cross-linking between the reactive mesogens is increased. That is, bonding of the cross-linking portion 15 is strengthened, a modulus is increased by improvement of the degree of cross-linking, and mechanical properties are improved, and thus, thereafter, a black afterimage and an instantaneous afterimage may be improved.

That is, in exemplary embodiments, the alignment layer includes the additive therein and an alignment layer compound, and the reactive mesogen having two or more photoreactive groups are connected to the main chain of the alignment layer compound.

Then, hereinafter, exemplary embodiments of the alignment layers 11 and 21 will be described in more detail.

In exemplary embodiments, the alignment layers 11 and 21 include an alignment layer polymer having a main chain 12, and a plurality of side chains connected to the main chain 12, and the additive.

First, the additive will be described. The exemplary alignment layer includes the additive therein, and the additive is dissolved out into the liquid crystals during the light irradiation process to be reacted with the reactive mesogen including the photoreactive group.

The additive is a material having several photoreactive groups. The photoreactive groups of the additive react with the photoreactive group of the reactive mesogen, or the photoreactive groups of additive react with each other. After light is irradiated, any remaining residual additive that has not reacted is removed in a fluorescent UV process.

In an exemplary embodiment, the additive included in the alignment layer may be at least one compound selected from the following:

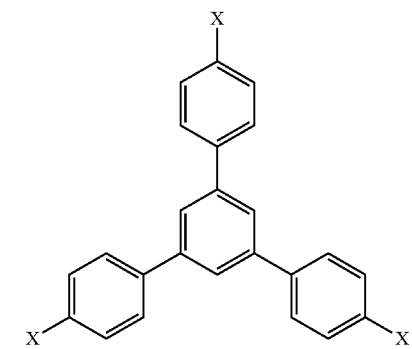

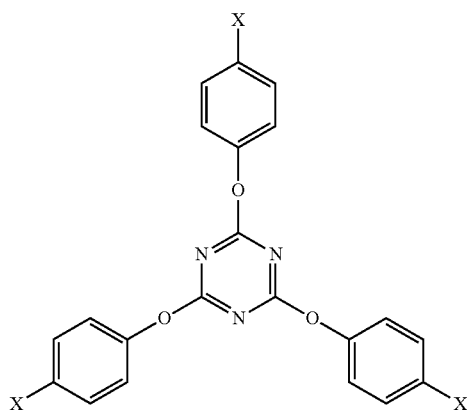

-continued

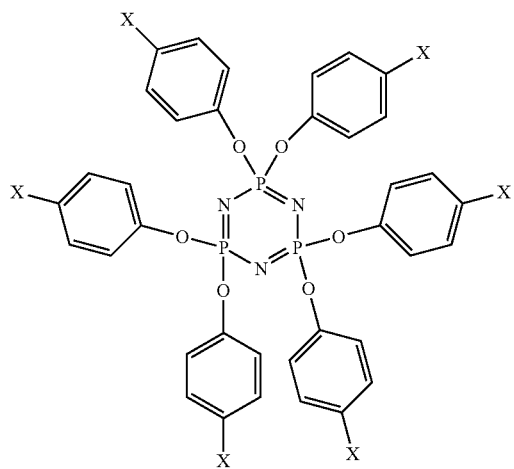

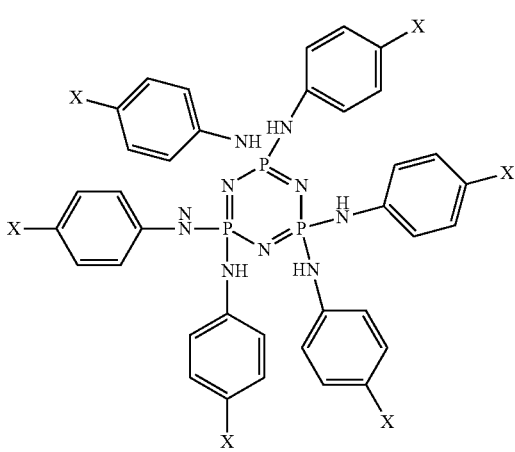

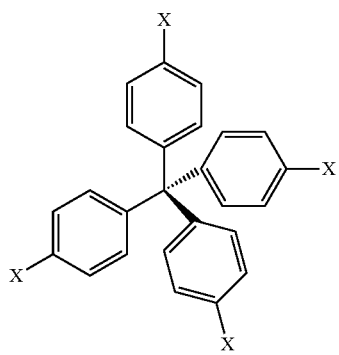

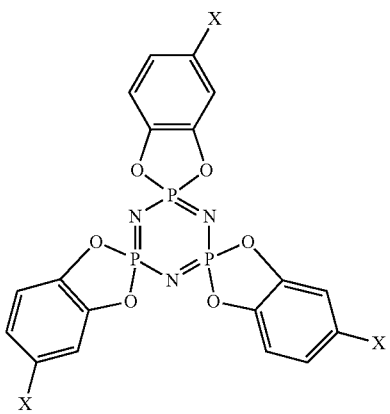

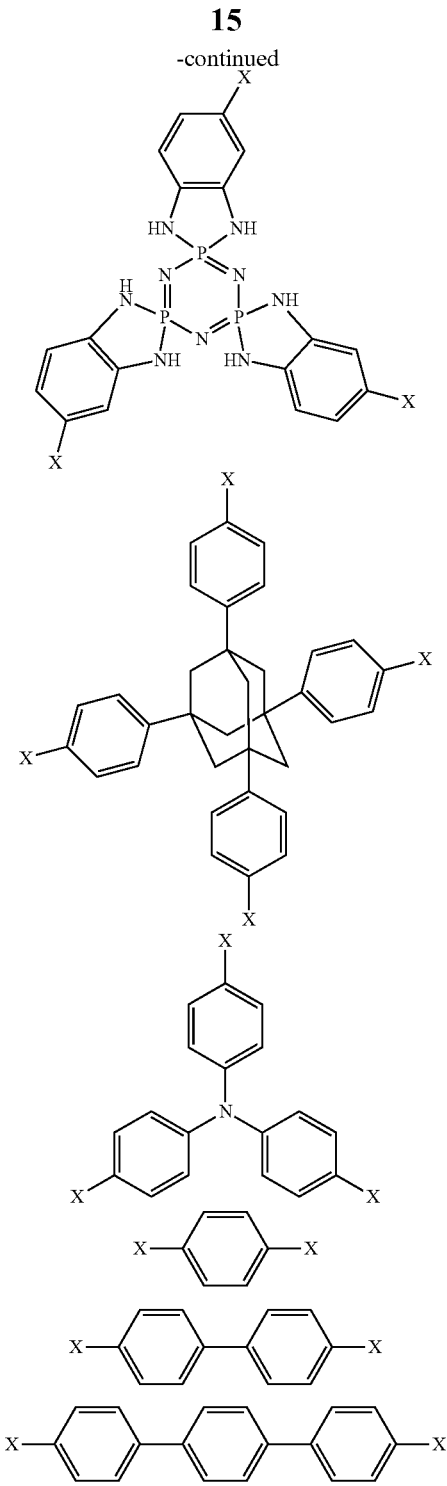

In the above compounds, each X is independently selected from:

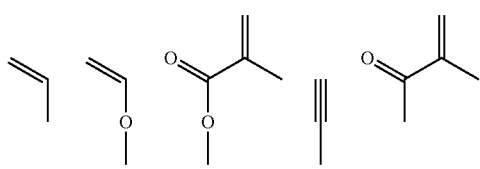

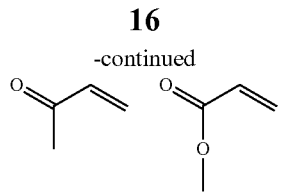

The additive compounds possess a central structure to which a plurality of photoreactive groups X is connected. For the additive compounds provided above, the central structure is a phenyl group, however the additive compound is not limited thereto, and the plurality of photoreactive groups X may be connected by biphenyl or terphenyl group instead of a phenyl. That is, in exemplary embodiments, an additive compound having a structure in which the central phenyl group of the above additive compounds is substituted by a biphenyl or terphenyl group in can also be used as the additive.

The photoreactive group represented by X reacts with the photoreactive group of the reactive mesogen connected to the main chain 12 to form a cross-linking bond.

The content of the additive may be about 0.01 percent (%) to about 50% by weight based on a total weight of the first alignment layer or the second alignment layer.

The main chain 12 and the plurality of side chains connected to the main chain 12 of the alignment layer will be described.

In the exemplary embodiment of the present invention, the main chain 12 may include a dianhydride, a diamine, and the like.

The plurality of side chains include the vertical expression group 13 connected to the main chain 12, or the reactive mesogen 10 including the photoreactive group 14 connected to the vertical expression group 13. That is, a portion of the plurality of side chains may include only the vertical expression group 13, and the other portion of the plurality of side chains may be the reactive mesogen 10 including the two or more photoreactive groups 14 connected to the vertical expression group 13.

The two or more photoreactive groups 14 included in the reactive mesogen 10 may be connected in a 'Y' form to one side of the vertical expression group 13, or connected in a 'I' form to both sides thereof, however, a connection method thereof is not limited.

Specifically, as illustrated in FIG. 3, the reactive mesogen may include the two photoreactive groups 14 positioned at an end of the reactive mesogen. Or, as illustrated in FIG. 4, the two photoreactive groups 14 may be positioned along a length direction of the reactive mesogen.

According to the photoreactive group arranged as illustrated in FIG. 3, a plurality of cross-linking portions 15 may be formed in parallel, and according to the photoreactive group 14 arranged as illustrated in FIG. 4, the plurality of cross-linking portions 15 may be positioned to be separated from each other.

The alignment layers 11 and 21 including the reactive mesogen may include at least one compound represented by Chemical Formula 1 and Chemical Formula 2, in which the side chain connected to the main chain represents the vertical expression group 13 and the photoreactive group 14 connected to the vertical expression group 13.

(Chemical Formula 1)
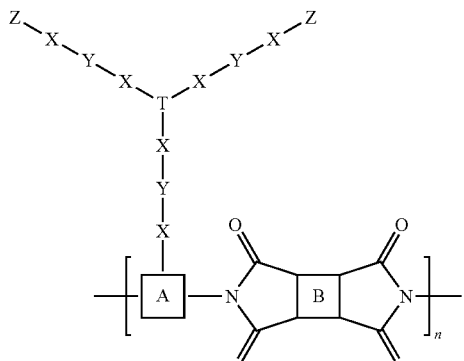
(Chemical Formula 2)
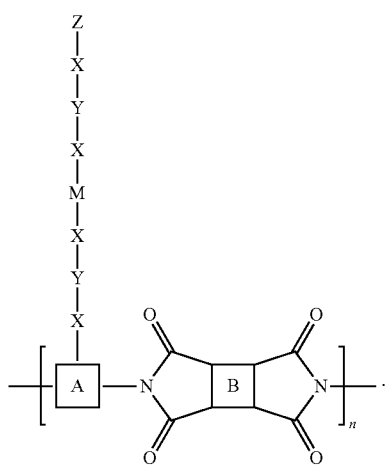
Herein, A is
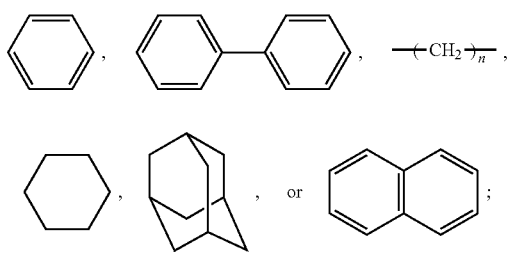
B is
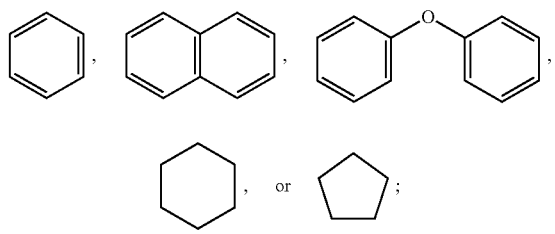
Each X is independently selected from
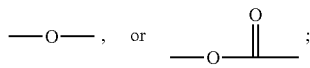
Each Y is independently selected from
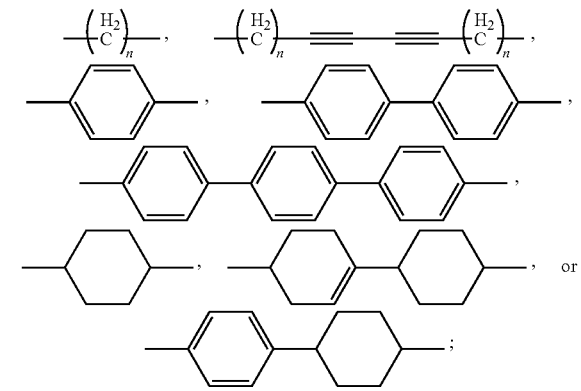
T is
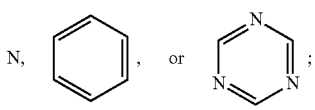 [SMILES: c1ccccc1 ; c1ncncn1]
M is
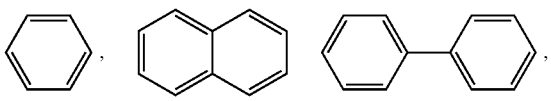
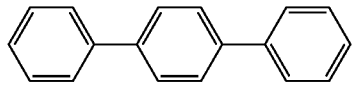
Each Z is independently selected from
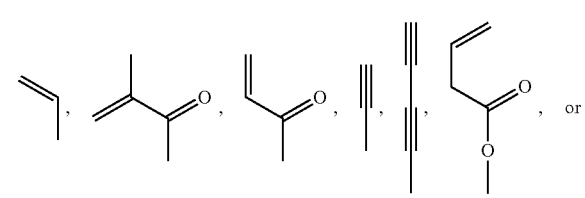

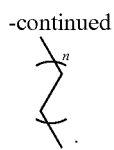

As used herein, n is a natural number greater than or equal to 1.

Particularly, in the compound represented by Chemical Formula 2, Y included in the side chain may have the following structure:

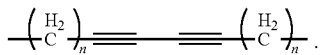

In the compound represented by Chemical Formula 2, the photoreactive group may be disposed to be parallel to the vertical expression group.

In Chemical Formulas 1 to 2, Y to Z included in the reactive mesogen may be the photoreactive group. That is, in Y or Z including an unsaturated bond of a double bond or more, a photoreaction may occur.

Figure 6:
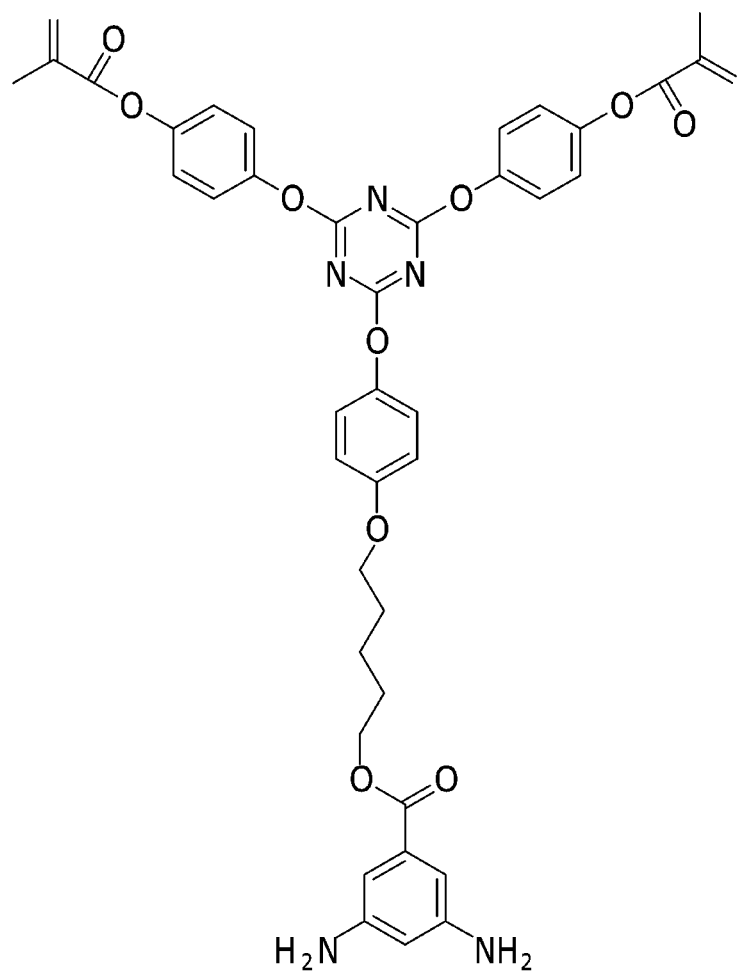
FIG. 6 is an exemplary embodiment of an alignment layer compound included in the alignment layer.
Figure 7:
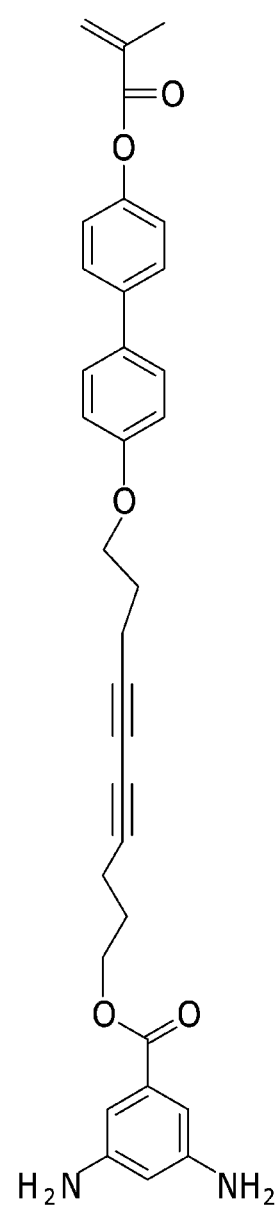
FIG. 7 is an exemplary embodiment of an alignment layer compound included in the alignment layer.

By the aforementioned combination, Chemical Formula 1 may be the compound illustrated in FIG. 6, and Chemical Formula 2 may be the compound illustrated in FIG. 7. However, any combination of the aforementioned compounds is feasible, and the combination is not limited to the compounds illustrated in FIGS. 6 to 7.

Further, while the present specification illustrates only the exemplary embodiment in which one reactive mesogen includes the two photoreactive groups, the invention is not limited thereto, and needless to say, one reactive mesogen may include two or more photoreactive groups.

As an example of Chemical Formula 1, a compound of FIG. 6 may be included in the alignment layer through the process illustrated in following Reaction Formula 1.

(Reaction Formula 1)

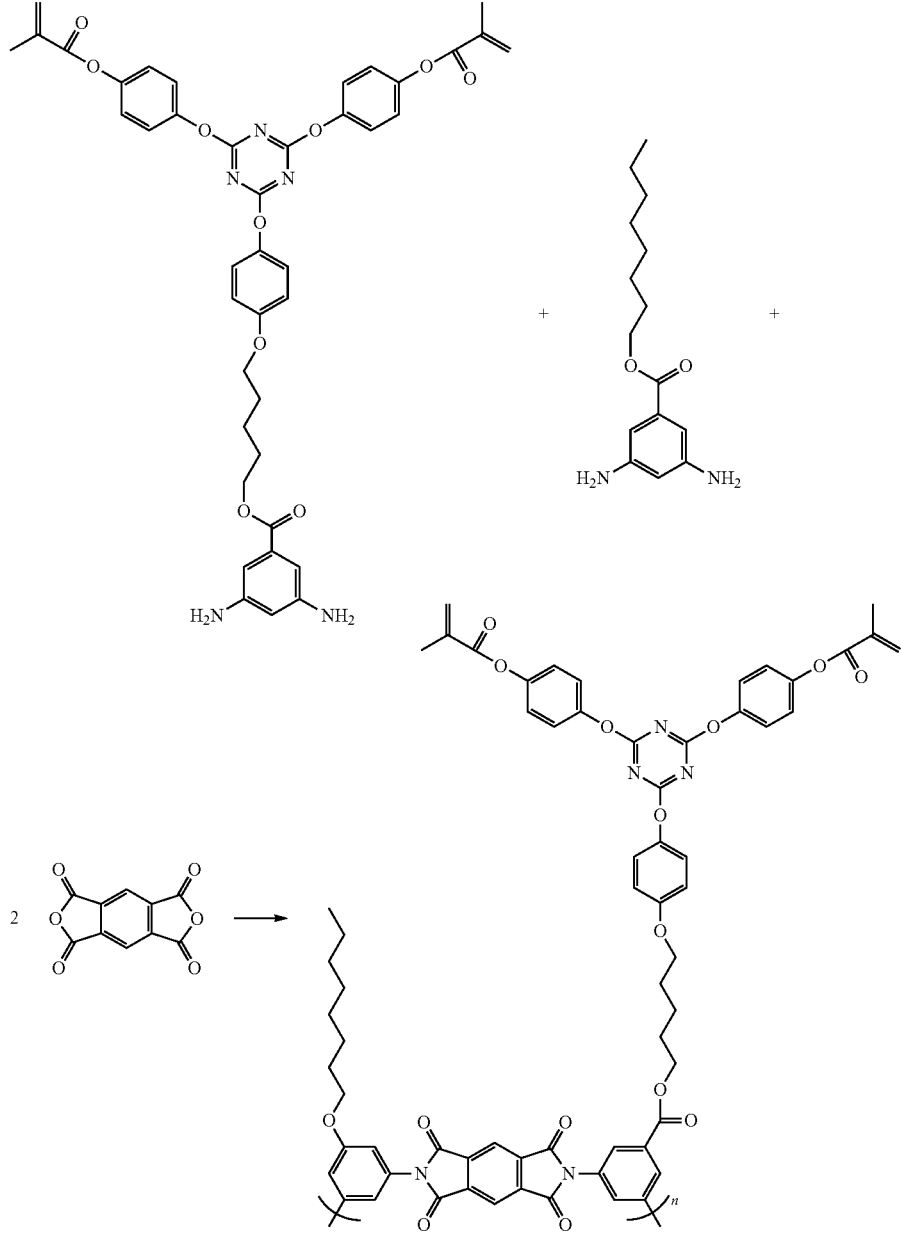

The alignment layer may be formed by co-polymerizing a monomer including the reactive mesogen including the photoreactive groups 14 at both ends, the vertical expression group 13, and a diamine compound, a monomer including the vertical expression group 13 and the diamine compound, and a dianhydride compound. In this case, the mole ratio of the diamine compound and the dianhydride compound may be about 1:1.

The process used to prepare the compound of FIG. 7 that is an example of Chemical Formula 2 is not illustrated herein. However, the reaction may be performed by substituting the reactive mesogen represented by Chemical Formula 2 (FIG. 7) for the reactive mesogen represented by Chemical Formula 1 (FIG. 6) in the aforementioned process.

An exemplary embodiment of an alignment layer will be described. In exemplary embodiments, alignment layers 11 and 21 include an alignment layer compound having a main chain and a plurality of side chains connected to the main chain, and an additive.

The content of the additive is the same as the content of the aforementioned exemplary embodiment. A detailed description of the similar or same constituent elements will be omitted.

That is, the additive included in the alignment layer may be at least one compound selected from the following group of compounds.

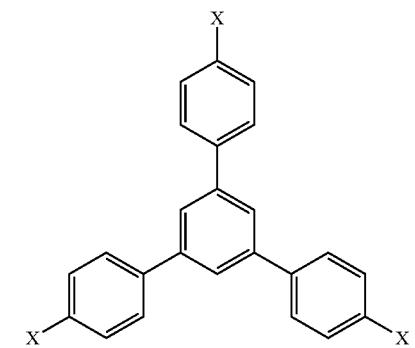

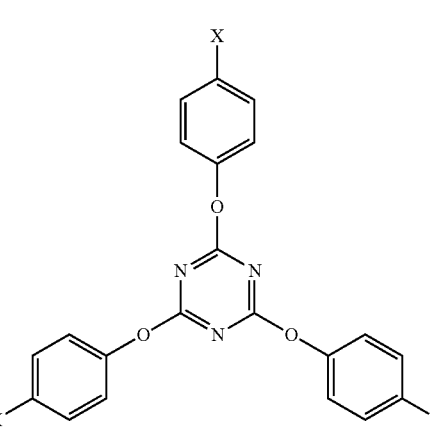

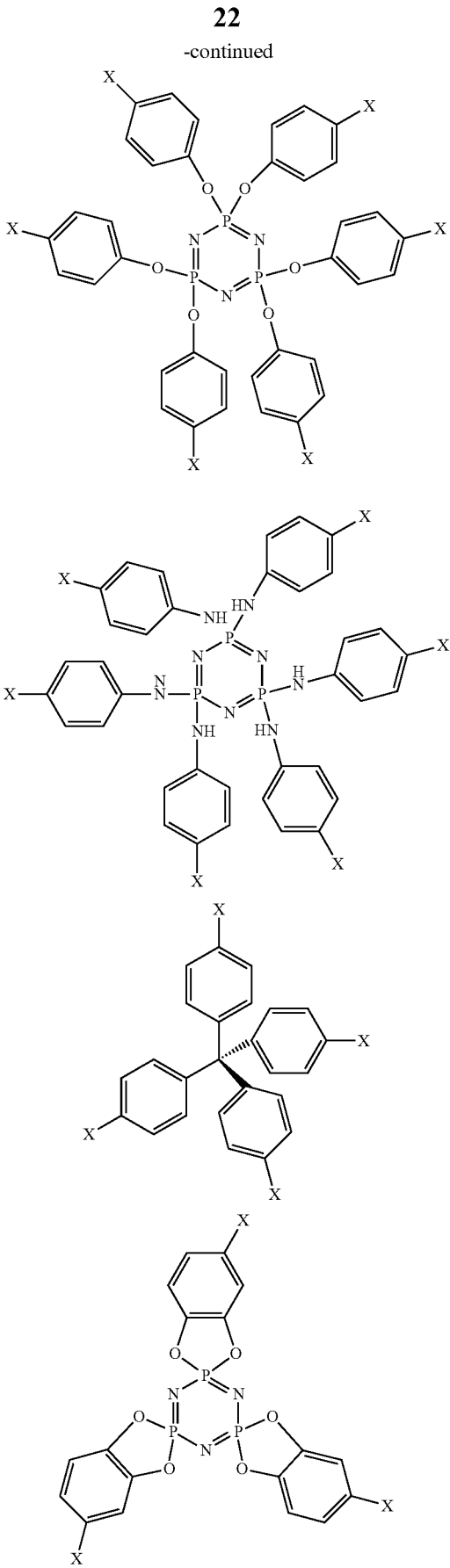

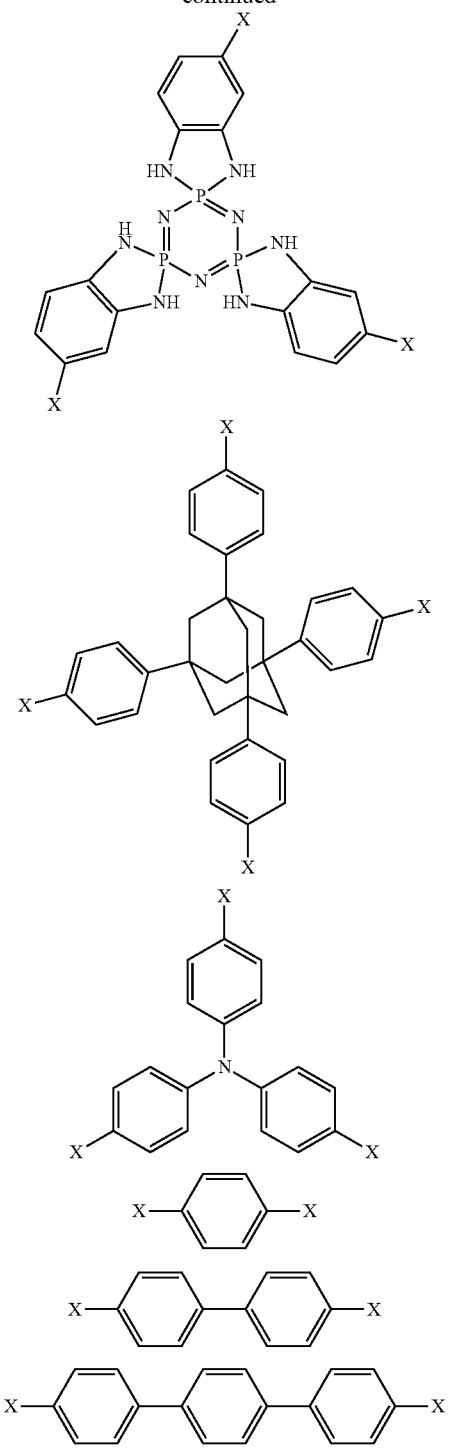

In which, each X is a compound selected from

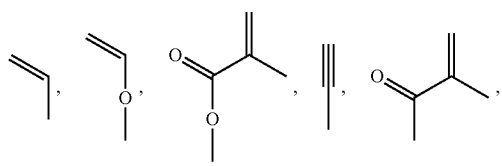

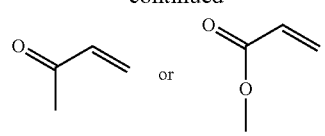

The additive compounds have a central structure and a plurality of photoreactive groups X are connected to the central structure. The additive compounds illustrated above, have a phenyl group as the central structure. However, the central structure may be a biphenyl or terphenyl group with the plurality of photoreactive groups X connected thereto, instead of a phenyl group. That is, an additive compound having a structure in which the central phenyl group of the above additive compounds is substituted by biphenyl or terphenyl instead of phenyl, can be used as the additive.

The photoreactive group represented by X reacts with the photoreactive group of the reactive mesogen connected to the main chain 12 to form a cross-linking bond.

In exemplary embodiments, the main chain 12 of the alignment polymer compound may be a polyphosphagen-based polymer. In an exemplary embodiment, the plurality of side chains connected to the main chain include a vertical expression group connected to the main chain, a reactive mesogen-including group connected to the main chain, and a capping group.

In an exemplary embodiment, the alignment layers 11 and 21 may include an alignment layer compound represented by the following Chemical Formula 3:

(Chemical Formula 3)

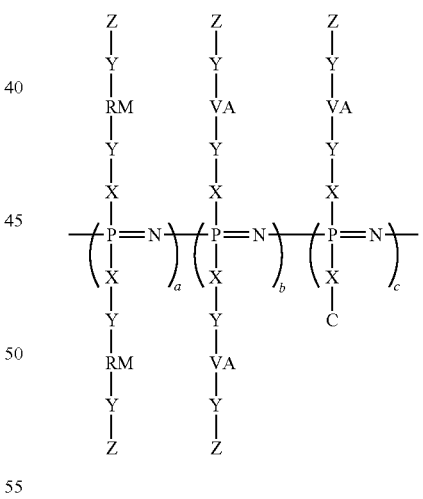

The compound represented by Chemical Formula 3 may be manufactured through the following process illustrated in Reaction Formula 2:

(Reaction Formula 2)

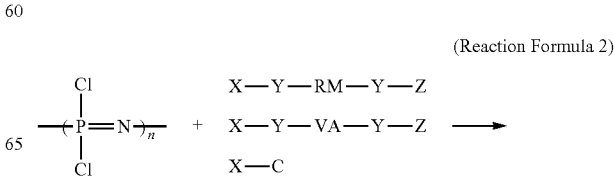

-continued

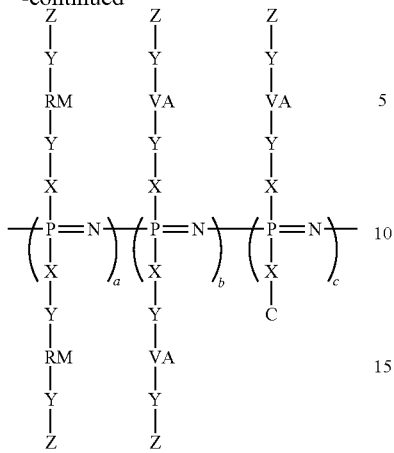

In Reaction Formula 2 and Chemical Formula 3, X-Y-RM-Y-Z is a reactive mesogen-including group, and serves to form a pretilt in the liquid crystals. Further, in Reaction Formula 2 and Chemical Formula 3, X-Y-VA-Y-Z is the vertical expression group and serves to ensure a vertically aligned ability in a VA mode. In Reaction Formula 2 and Chemical Formula 3, X-C is the capping group and serves to remove any unreacted Cl groups which remain after light irradiation and a reaction.

In Chemical Formula 3 and Reaction Formula 2, RM is a reactive mesogen unit and is selected from

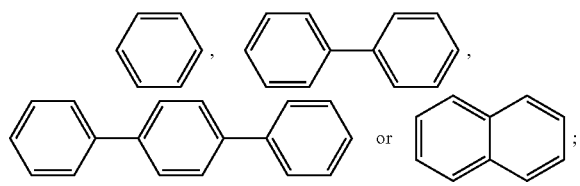

In Chemical Formula 3 and Reaction Formula 2, VA is a vertical alignment groups and is selected from

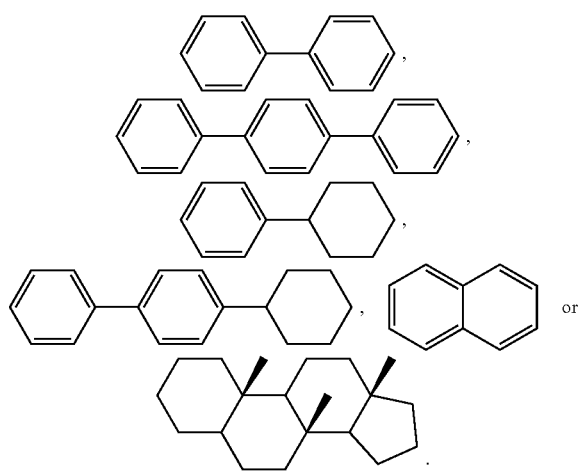

In Chemical Formula 3 and Reaction Formula 2, X is a linker and is selected from —$NH_2$ or —OH.

In Chemical Formula 3 and Reaction Formula 2, Y is a linker and each Y is independently selected from

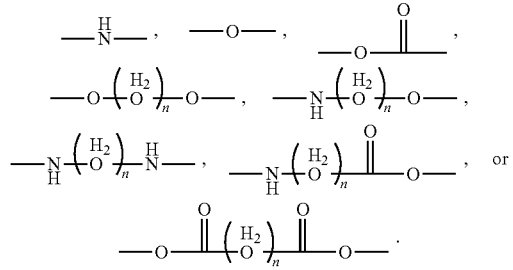

In Chemical Formula 3 and Reaction Formula 2, Z may be the photoreactive group or a heat-reactive group, and is selected from

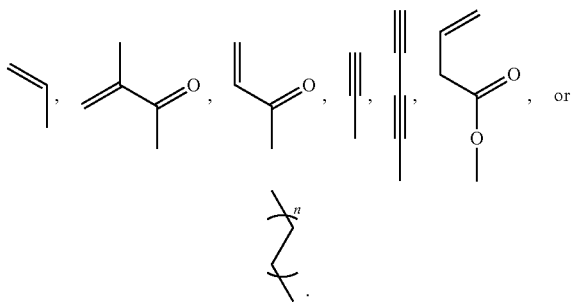

In Chemical Formula 3 and Reaction Formula 2, C is OH, —$NH_2$, trifluoroethyl, ethyl, propyl, t-butyl, butyl, and saturated/unsaturated hydrocarbons substituted with a plurality of halogens.

C can be used without a limitation as long as C is a functional group that can perform a substitution reaction with a Cl group on the phosphagen main chain. The C group removes the unreacted Cl that is not reacted but remains through the substitution reaction with —Cl of the polyphosphagen main chain.

As used herein, n is a natural number greater than or equal to 1.

In Chemical Formula 3, a, b and c each represent a constitution ratio of repeating units, and each of a, b and c have a value of 0 to 100%. In the case where a, b, and c are represented by the ratio instead of a percentage, a, b and c each have a value of 0 to 1. In this case, a sum of a, b, and c is 1.

Figure 8:
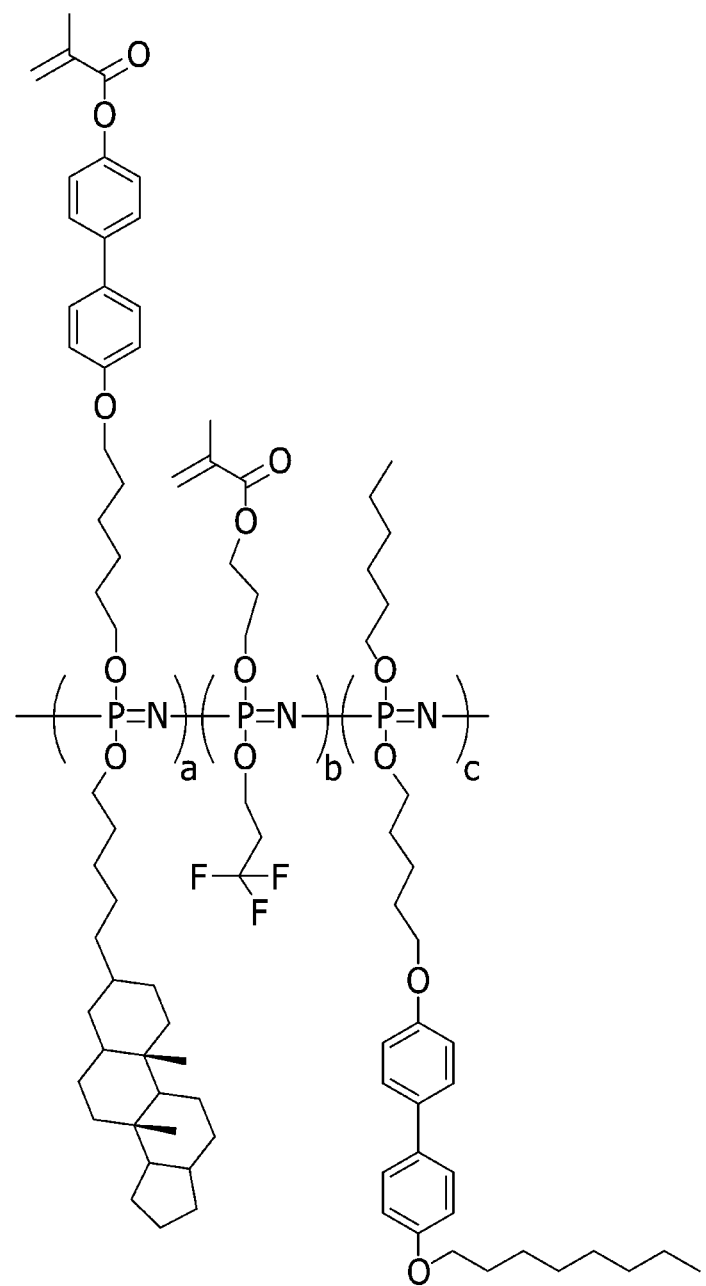
FIG. 8 is an example of the exemplary alignment layer compound included in the alignment layer.

In exemplary embodiments, the compound of Chemical Formula 3 may be the compound illustrated in FIG. 8. That is, the compound illustrated in FIG. 8 is an example of the compound of Chemical Formula 3. The compound illustrated in FIG. 8 includes the vertical expression group connected to the polyphosphagen-based main chain and the photoreactive group connected to the vertical expression group, and the photoreactive groups are present in a plurality.

The photoreactive groups perform a polymerization reaction with each other when light is irradiated thereon. In this case, the additive included in the alignment layer is dissolved out into the liquid crystals, the photoreactive group of the additive and the photoreactive groups connected to the polyphosphagen-based main chain react with each other, and thus a cross-linking bond is further firmly formed.

An increase in the number of cross-linking bonds increases the elastic modulus of an alignment layer polymer.

As the elastic modulus of the polymer increases, the polymers are further firmly bonded to each other, and thus a black afterimage and an instantaneous afterimage are improved as compared with an alignment layer including the polymer having the low elastic modulus.

The instantaneous afterimage and the black afterimage occur because the polymer deviates from the originally formed pretilt and easily moves in the case where the modulus of the polymer having the pretilt is low. However, in the exemplary liquid crystal display according, the additive having the photoreactive group is included in the alignment layer, and the reactive mesogen having the plurality of photoreactive groups is connected to the main chain included in the alignment layer.

Accordingly, since the cross-linking portion may be formed in plural as compared to the case where only one photoreactive group is present, the polymers are further firmly bonded and mechanical properties are improved. Further, the additive having the photoreactive group is dissolved out to react with the photoreactive group of the additive with the photoreactive group connected to the main chain. Accordingly, the cross-linking bond of the polymer is increased and the polymers are further firmly bonded, and thus the modulus is increased. An increase in elastic modulus of the polymer allows the pretilt formed during the course of applying a voltage and irradiating light to be further firmly fixed, and thus prevents the pretilt already formed by an external condition from being changed. Accordingly, the black afterimage and the instantaneous afterimage of the alignment layer are increased.

Figure 9:
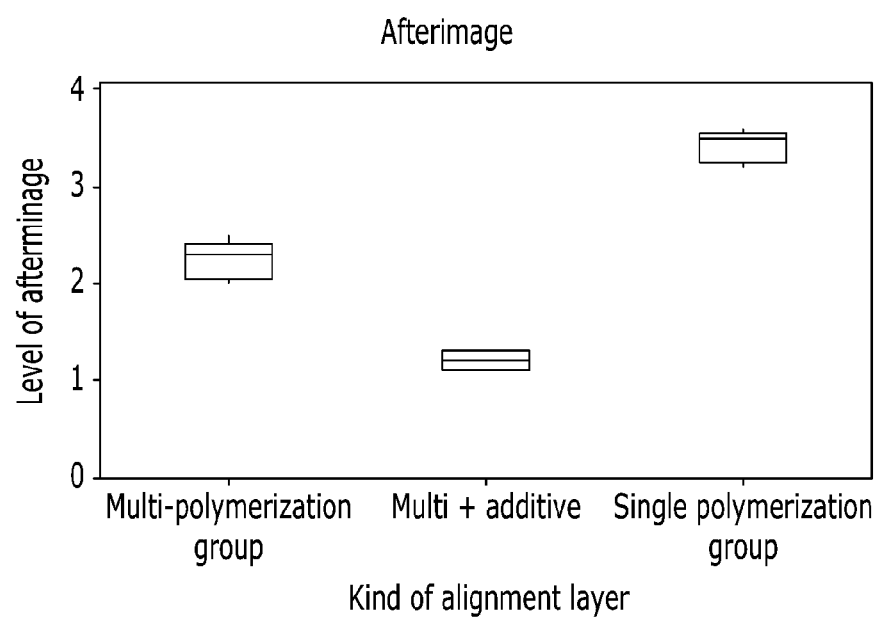
FIG. 9 is a graph illustrating the afterimage of a liquid crystal display versus the type (kind) of alignment layer used.

The level of the afterimage of the liquid crystal display to which the exemplary alignment layer is applied was evaluated through an experiment, and the results are illustrated in FIG. 9.

FIG. 9 is a graph illustrating the level of afterimage associated with the kind of alignment layer used. Referring to the results of afterimage evaluation shown in FIG. 9, it could was confirmed that in the case where the alignment layer adopting a single polymerization group (presence of one photoreactive group only) was used, the afterimage disappeared after about 3.5 seconds. However, in the case where a multi-polymerization group (presence of the plurality of photoreactive groups) was used, the afterimage disappeared after about 2 seconds. That is, it was confirmed that when a plurality of photoreactive groups were present in the alignment layer, the afterimage was improved.

Further, referring to FIG. 9, it was also confirmed that in the case where the multi-polymerization group (presence of the plurality of photoreactive groups) was used and the additive was included in the alignment layer ("Multi+additive"), the afterimage disappeared after about 1 second. That is, it was confirmed that when the polymer including the multi-polymerization group was used and the additive was included in the alignment layer, the afterimage improvement effect was the best.

Figure 10:
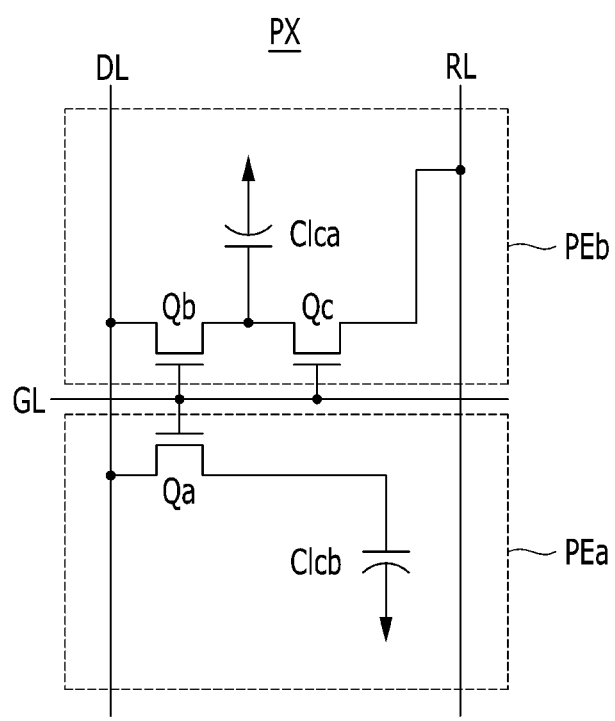
FIG. 10 is a circuit diagram for one pixel of the liquid crystal display according to the exemplary embodiment of the present invention.

Disposal of a signal line and a pixel of the liquid crystal display according to the exemplary embodiment of the present invention, and a driving method thereof will be described with reference to FIG. 10. FIG. 10 is an equivalent circuit diagram for one pixel of an exemplary embodiment of the liquid crystal display.

Referring to FIG. 10, one pixel PX of the liquid crystal display according to the present exemplary embodiment includes a plurality of signal lines including a gate line GL transferring a gate signal, a data line DL transferring a data signal, a divided voltage reference voltage line RL transferring a divided voltage reference voltage, first, second, and third switching elements Qa, Qb, and Qc, and first and second liquid crystal capacitors Clca and Clcb connected to the plurality of signal lines.

The first and second switching elements Qa and Qb are connected to the gate line GL and the data line DL, respectively, and the third switching element Qc is connected to an output terminal of the second switching element Qb and the divided voltage reference voltage line RL.

The first switching element Qa and the second switching element Qb are a three terminal element such as a thin film transistor, a control terminal thereof is connected to the gate line GL, an input terminal thereof is connected to the data line DL, an output terminal of the first switching element Qa is connected to the first liquid crystal capacitor Clca, and the output terminal of the second switching element Qb is connected to the second liquid crystal capacitor Clcb and an input terminal of the third switching element Qc.

The third switching element Qc is also the three terminal element such as a thin film transistor ("TFT"), a control terminal thereof is connected to the gate line GL, the input terminal thereof is connected to the second liquid crystal capacitor Clcb, and an output terminal thereof is connected to the divided voltage reference voltage line RL.

If a "gate on" signal is applied to the gate line GL, the first switching element Qa, the second switching element Qb, and the third switching element Qc connected thereto are turned on. Accordingly, the data voltage applied to the data line DL is applied to the first sub-pixel electrode PEa and the second sub-pixel electrode PEb through the first switching element Qa and the second switching element Qb that are turned on. In this case, the data voltages applied to the first sub-pixel electrode PEa and the second sub-pixel electrode PEb are the same as each other, and the first liquid crystal capacitor Clca and the second liquid crystal capacitor Clcb are charged by the same value as a difference between the common voltage and the data voltage. Simultaneously, the voltage charged in the second liquid crystal capacitor Clcb is divided through the turned-on third switching element Qc. Thereby, a value of the voltage charged in the second liquid crystal capacitor Clcb is reduced by a difference between the common voltage and the divided voltage reference voltage. That is, the voltage charged in the first liquid crystal capacitor Clca becomes higher than the voltage charged in the second liquid crystal capacitor Clcb.

Like this, the voltage charged in the first liquid crystal capacitor Clca and the voltage charged in the second liquid crystal capacitor Clcb become different from each other. Since the voltage of the first liquid crystal capacitor Clca and the voltage of the second liquid crystal capacitor Clcb are different from each other, inclination angles of liquid crystal molecules in a first sub-pixel and a second sub-pixel become different from each other, and thus luminances of the two sub-pixels also become different from each other. Accordingly, if the voltage of the first liquid crystal capacitor Clca and the voltage of the second liquid crystal capacitor Clcb are appropriately adjusted, an image viewed in a lateral surface may approach an image viewed in a front surface as closely as possible, and thus lateral surface visibility may be improved.

In the illustrated exemplary embodiment, in order to make the voltage charged in the first liquid crystal capacitor Clca and the voltage charged in the second liquid crystal capacitor Clcb different, the third switching element Qc connected to the second liquid crystal capacitor Clcb and the divided voltage reference voltage line RL is included. However, in other exemplary embodiments, the second liquid crystal capacitor Clcb may be connected to a step-down capacitor.

Specifically, the third switching element including a first terminal connected to a step-down gate line, a second terminal connected to the second liquid crystal capacitor Clcb, and a third terminal connected to a step-down capacitor may be included to charge a portion of an amount of electric charges charged in the second liquid crystal capacitor Clcb in the step-down capacitor and thus charge voltages between the first liquid crystal capacitor Clca and the second liquid crystal capacitor Clcb may be set to be different from each other. Further, in other exemplary embodiments, a first liquid crystal capacitor Clca and a second liquid crystal capacitor Clcb may be connected to different data lines to receive different data voltages and thus charge voltages between the first liquid crystal capacitor Clca and the second liquid crystal capacitor Clcb may be set to be different from each other. In addition, the charge voltages between the first liquid crystal capacitor Clca and the second liquid crystal capacitor Clcb may be set to be different from each other by various other methods.

Figure 12:
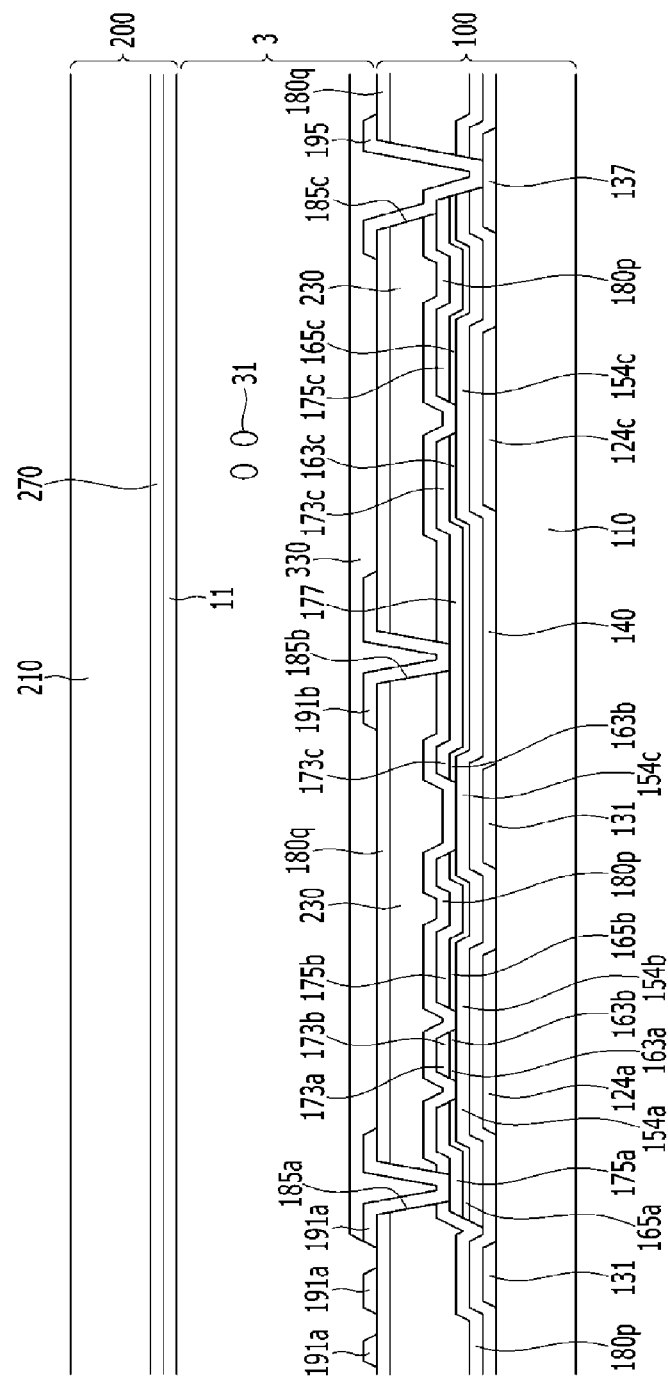
FIG. 12 is a cross-sectional view of the exemplary liquid crystal display of FIG. 11, which is taken along line V-V.
Figure 13:
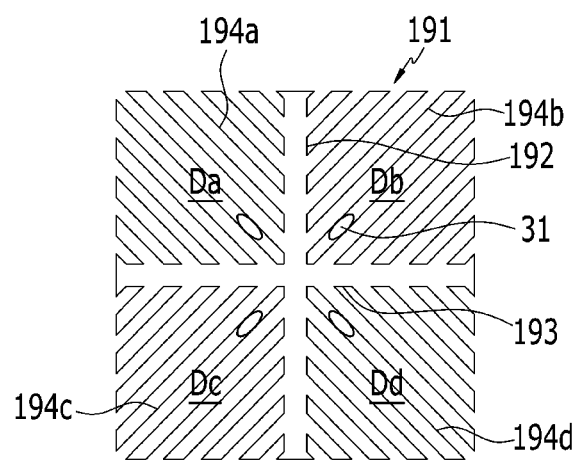
FIG. 13 is a top plan view illustrating a basic region of a pixel electrode of an exemplary embodiment of the liquid crystal display.

Then, a structure of the liquid crystal display according to the exemplary embodiment illustrated in FIG. 10 will be briefly described with reference to FIGS. 11 through 13. FIG. 11 is a plan view for an exemplary embodiment of one pixel of the exemplary liquid crystal display. FIG. 12 is a cross-sectional view taken along line V-V of the exemplary liquid crystal display of FIG. 11. FIG. 13 is a top plan view illustrating a basic region of a pixel electrode of an exemplary embodiment of the liquid crystal display.

First, referring to FIGS. 11 and 12, the liquid crystal display includes a lower display panel 100 and an upper display panel 200 facing each other, a liquid crystal layer 3 interposed between the two display panels 100 and 200, and a pair of polarizers (not illustrated) attached to outer surfaces of the display panels 100 and 200.

First, the lower display panel 100 will be described.

A gate conductor including a gate line 121 and a divided voltage reference voltage line 131 is formed on an insulating substrate 110 made of transparent glass, plastics, or the like.

The gate line 121 includes a first gate electrode 124a, a second gate electrode 124b, a third gate electrode 124c, and a wide end portion (not illustrated) for connection to another layer or an external driving circuit.

The divided voltage reference voltage line 131 includes first storage electrodes 135 and 136 and a reference electrode 137. Second storage electrodes 138 and 139 that are not connected to the divided voltage reference voltage line 131 but overlap with a second sub-pixel electrode 191b are positioned.

A gate insulating layer 140 is formed on the gate line 121 and the divided voltage reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines 171 including a first source electrode 173a and a second source electrode 173b, a first drain electrode 175a, a second drain electrode 175b, a third source electrode 173c, and a third drain electrode 175c is formed on the ohmic contacts 163a, 165a, 163b, 165b, 163c, and 165c and the gate insulating layer 140.

The data conductor, and the semiconductors and the ohmic contacts positioned therebeneath may be formed simultaneously by using one mask.

The data line 171 includes a wide end portion (not illustrated) for connection with another layer or the external driving circuit.

The first gate electrode 124a, the first source electrode 173a, and the first drain electrode 175a form one thin film transistor (TFT) Qa together with a first semiconductor island 154a, and a channel of the thin film transistor is formed in the first semiconductor 154a between the first source electrode 173a and the first drain electrode 175a. Similarly, the second gate electrode 124b, the second source electrode 173b, and the second drain electrode 175b form one second thin film transistor Qb together with a second semiconductor 154b, and a channel is formed in the second semiconductor 154b between the second source electrode 173b and the second drain electrode 175b. The third gate electrode 124c, the third source electrode 173c, and the third drain electrode 175c form one third thin film transistor Qc together with a third semiconductor 154c, and a channel is formed in the third semiconductor 154c between the third source electrode 173c and the third drain electrode 175c.

The second drain electrode 175b includes an expanded portion 177 connected to the third source electrode 173c and widely expanded.

A first passivation layer 180p is formed on the data conductors 171, 173c, 175a, 175b, and 175c and the exposed portion of the semiconductors 154a, 154b, and 154c. The first passivation layer 180p may include an inorganic insulating layer such as silicon nitride or silicon oxide. The first passivation layer 180p may prevent a pigment of a color filter 230 from flowing into the exposed portion of the semiconductors 154a, 154b, and 154c.

The color filter 230 is formed on the first passivation layer 180p. The color filter 230 extends in a vertical direction along two adjacent data lines. A first light blocking member 220 is positioned on the first passivation layer 180p, an edge of the color filter 230, and the data line 171.

The first light blocking member 220 extends along the data line 171, and is positioned between the two adjacent color filters 230. A width of the first light blocking member 220 may be larger than a width of the data line 171. Like this, the first light blocking member 220 may prevent light that is incident from the outside from being reflected on a surface of the data line 171 that is a metal by forming the first light blocking member 220 so that the width of the first light blocking member 220 is larger than the width of the data line 171. Accordingly, light reflected on the surface of the data line 171 may interfere with light passing through the liquid crystal layer 3 to prevent deterioration of a contrast ratio of the liquid crystal display.

A second passivation layer 180q is formed on the color filter 230 and the first light blocking member 220.

The second passivation layer 180q may include an inorganic insulating layer such as silicon nitride or silicon oxide. The second passivation layer 180q prevents peeling of the color filter 230, and suppresses contamination of the liquid crystal layer 3 by an organic material such as a solvent flowing from the color filter 230 to prevent defects such as afterimages that may occur when an image is driven.

A first contact hole 185a and a second contact hole 185b through which the first drain electrode 175a and the second drain electrode 175b are exposed are formed in the first passivation layer 180p and the second passivation layer 180q.

A third contact hole 185c through which a portion of the reference electrode 137 and a portion of the third drain electrode 175c are exposed is formed in the first passivation layer 180p, the second passivation layer 180q, and the gate insulating layer 140, and the third contact hole 185c is covered by a connecting member 195. The connecting member 195 electrically connects the reference electrode 137 and the third drain electrode 175c exposed through the third contact hole 185c.

A plurality of pixel electrodes 191 are formed on the second passivation layer 180q. The pixel electrodes 191 are separated from each other while the gate line 121 is interposed therebetween, and each of the pixel electrodes 191 includes the first sub-pixel electrode 191a and the second sub-pixel electrode 191b adjacent to one another in a column direction based on the gate line 121. The pixel electrode 191 may be formed of a transparent material such as indium tin oxide ("ITO") and indium zinc oxide ("IZO"). The pixel electrode 191 may be made of a transparent conductive material such as ITO or IZO, or a reflective metal such as aluminum, silver, chromium, or an alloy thereof.

The first sub-pixel electrode 191a and the second sub-pixel electrode 191b each include a basic electrode 194 illustrated in FIG. 10 or one or more modifications thereof.

The first sub-pixel electrode 191a and the second sub-pixel electrode 191b are physically and electrically connected through the first contact hole 185a and the second contact hole 185b to the first drain electrode 175a and the second drain electrode 175b, respectively, and receive a data voltage from the first drain electrode 175a and the second drain electrode 175b. In this case, a portion of the data voltage applied to the second drain electrode 175b is divided through the third source electrode 173c, and thus a magnitude of a voltage applied to the first sub-pixel electrode 191a is larger than a magnitude of a voltage applied to the second sub-pixel electrode 191b.

The first sub-pixel electrode 191a and the second sub-pixel electrode 191b to which the data voltage is applied generate an electric field together with the common electrode 270 of the upper display panel 200 to determine a direction of the liquid crystal molecules of the liquid crystal layer 3 between two electrodes 191 and 270. The luminance of light passing through the liquid crystal layer 3 is changed according to the thusly determined direction of the liquid crystal molecules.

A second light blocking member 330 is positioned on the pixel electrode 191. The second light blocking member 330 is formed to cover all of a first transistor Qa, a second transistor Qb, and a third transistor Qc, and regions in which the first to third contact holes 185a, 185b, and 185c are positioned, and extends in the same direction as the gate line 121 and thus is positioned to overlap with a portion of the data line 171. The second light blocking member 330 may be positioned to at least partially overlap with the two data lines 171 positioned at both sides of one pixel region to prevent light leakage that may occur around the data line 171 and the gate line 121 and prevent light leakage in a region in which the first transistor Qa, the second transistor Qb, and the third transistor Qc are positioned.

Until the second light blocking member 330 is formed, the first passivation layer 180p, the color filter 230, and the second passivation layer 180q may be positioned in the region in which the first transistor Qa, the second transistor Qb, the third transistor Qc, and the first to third contact holes 185a, 185b, and 185c are positioned to easily discriminate positions of the first transistor Qa, the second transistor Qb, the third transistor Qc, and the first to third contact holes 185a, 185b, and 185c.

A first alignment layer 11 is positioned on the second light blocking member 330. As described above, the first alignment layer 11 includes the reactive mesogen having the two or more photoreactive groups, and in exemplary embodiments, may be represented by the compounds illustrated in FIG. 6, 8, or 9. Further, the alignment layer may include an additive having a plurality of photoreactive groups therein. As described above, the additive may be at least one compounds selected from the following groups of compounds.

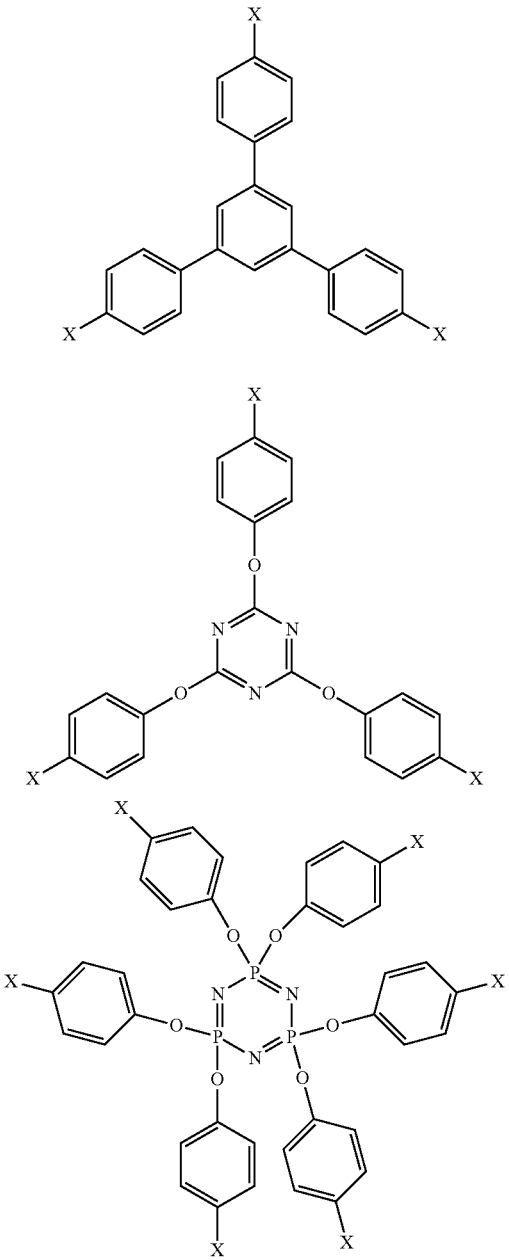

-continued

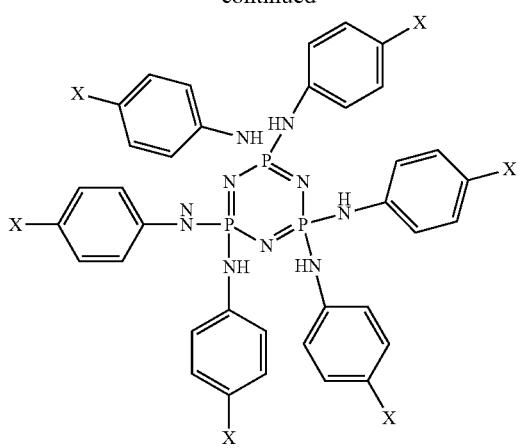

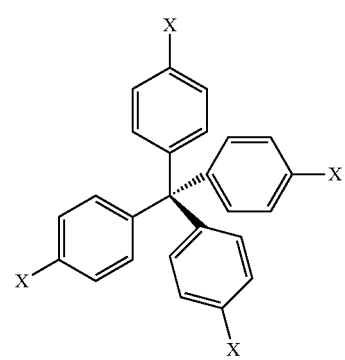

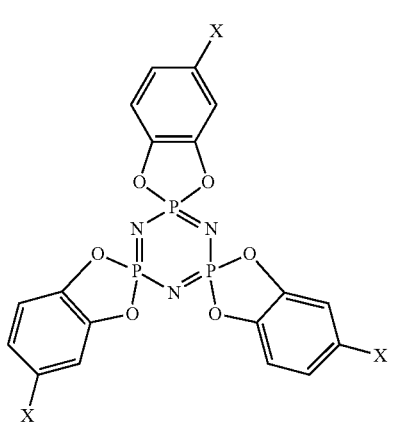

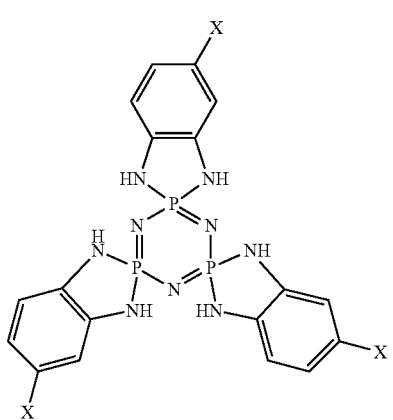

-continued

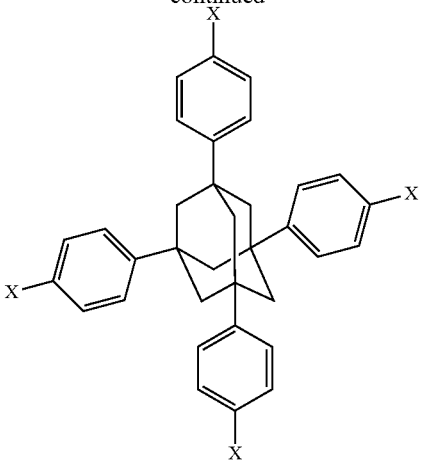

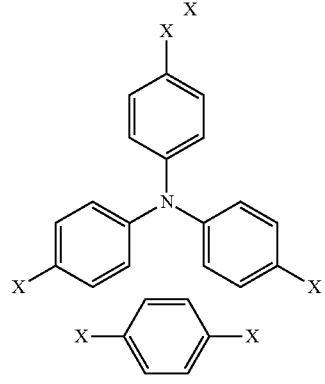

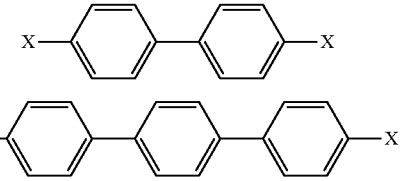

In the above compounds, each X is independently selected from

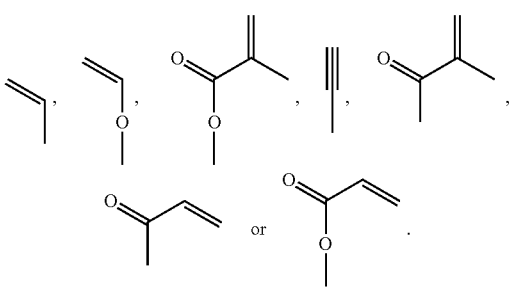

Accordingly, when light is irradiated on the alignment layer, the two or more photoreactive groups connected to the reactive mesogen and the photoreactive group included in the additive react with each other to firmly form a cross-linking bond. Through the aforementioned alignment layer, mechanical properties of the alignment layer are improved, and a change in pretilt angle is suppressed to improve a black afterimage and an instantaneous afterimage.

Now, the upper display panel 200 will be described.

The common electrode 270 is formed on the insulating substrate 210. A second alignment layer 21 is formed on the common electrode 270. The second alignment layer 21 may be a vertical alignment layer, and may be made of the same material as the aforementioned first alignment layer 11. The composition of the second alignment layer is the same as the composition described herein for the aforementioned first alignment layer. A detailed description of the same or similar constituent elements will be omitted. That is, the second alignment layer also includes the reactive mesogen having the two or more photoreactive groups, and in exemplary embodiments, may be represented by the compounds illustrated in FIG. 6, 8, or 9. Further, the alignment layer may include the additive having the plurality of photoreactive groups therein.

The liquid crystal layer 3 has negative dielectric anisotropy, and the liquid crystal molecules of the liquid crystal layer 3 are aligned so that long axes thereof are vertical to surfaces of the two display panels 100 and 200 in a state in which there is no electric field.

The basic electrode 194 will be described with reference to FIG. 13.

As illustrated in FIG. 13, an entire shape of the basic electrode 194 is a quadrangle, and the basic electrode 194 includes a cross-shaped stem portion formed of a horizontal stem portion 193 and a vertical stem portion 192 that is orthogonal thereto. Further, the basic electrode 194 is divided into a first sub-region Da, a second sub-region Db, a third sub-region Dc, and a fourth sub-region Dd by the horizontal stem portion 193 and the vertical stem portion 192, and each of the sub-regions Da to Dd includes a plurality of first fine branch portions 194a, a plurality of second fine branch portions 194b, a plurality of third fine branch portions 194c, and a plurality of fourth fine branch portions 194d.

The first fine branch portion 194a extends obliquely in an upper left direction from the horizontal stem portion 193 or the vertical stem portion 192, and the second fine branch portion 194b extends obliquely in an upper right direction from the horizontal stem portion 193 or the vertical stem portion 192. Further, the third fine branch portion 194c extends in a lower left direction from the horizontal stem portion 193 or the vertical stem portion 192, and the fourth fine branch portion 194d extends obliquely in a lower right direction from the horizontal stem portion 193 or the vertical stem portion 192.

The first to fourth fine branch portions 194a, 194b, 194c, and 194d form an angle of about 45 degrees (°) or about 135° to the gate lines 121a and 121b or the horizontal stem portion 193. Further, the fine branch portions 194a, 194b, 194c, and 194d of the two adjacent sub-regions Da, Db, Dc, and Dd may be orthogonal to each other.

Widths of the fine branch portions 194a, 194b, 194c, and 194d may be about 2.5 micrometers (μm) to about 5.0 μm and a gap between the adjacent fine branch portions 194a, 194b, 194c, and 194d in one sub-region Da, Db, Dc, or Dd may be about 2.5 μm to about 5.0 μm.

According to another exemplary embodiment, the widths of the fine branch portions 194a, 194b, 194c, and 194d may be increased as the fine branch portions become closer to the horizontal stem portion 193 or the vertical stem portion 192, and a difference between the largest width portion and the narrowest portion in one fine branch portion 194a, 194b, 194c, or 194d may be about 0.2 μm to about 1.5 μm.

The first sub-pixel electrode 191a and the second sub-pixel electrode 191b are connected through the first contact hole 185a and the second contact hole 185b to the first drain electrode 175a or the second drain electrode 175b, and receive a data voltage from the first drain electrode 175a and the second drain electrode 175b. In this case, sides of the first to fourth fine branch portions 194a, 194b, 194c, and 194d distort an electric field to generate a horizontal component determining an inclination direction of the liquid crystal molecules 31. The horizontal components of the electric field are almost horizontal to the sides of the first to fourth fine branch portions 194a, 194b, 194c, and 194d. Therefore, as illustrated in FIG. 5, the liquid crystal molecules 31 are inclined in a direction that is parallel to length directions of the fine branch portions 194a, 194b, 194c, and 194d. Since one pixel electrode 191 includes four sub-regions Da to Dd in which length directions of the fine branch portions 194a, 194b, 194c, and 194d are different from each other, the directions where the liquid crystal molecules 31 are inclined are about four directions, and four domains where the alignment directions of the liquid crystal molecules 31 are different from each other are formed in the liquid crystal layer 3. As described above, if the inclination directions of the liquid crystal molecules are diversified, a reference viewing angle of the liquid crystal display is increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first insulating substrate,
   a second insulating substrate facing the first insulating substrate,
   a pixel electrode positioned on the first insulating substrate,
   a common electrode positioned on the first insulating substrate or the second insulating substrate,
   a first alignment layer positioned on the first insulating substrate,
   a second alignment layer positioned on the second insulating substrate, and
   a liquid crystal layer positioned between the first insulating substrate and the second insulating substrate,
   wherein at least one of the first alignment layer and the second alignment layer comprises an alignment layer compound and an additive,
   wherein the alignment layer compound comprises a main chain and a plurality of side chains, wherein at least one of the plurality of side chains comprises a vertical alignment group, and a reactive mesogen comprising one or more photoreactive groups, and
   wherein the additive comprises at least one compound selected from the following:

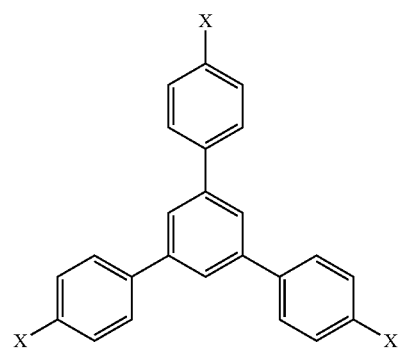

37
-continued
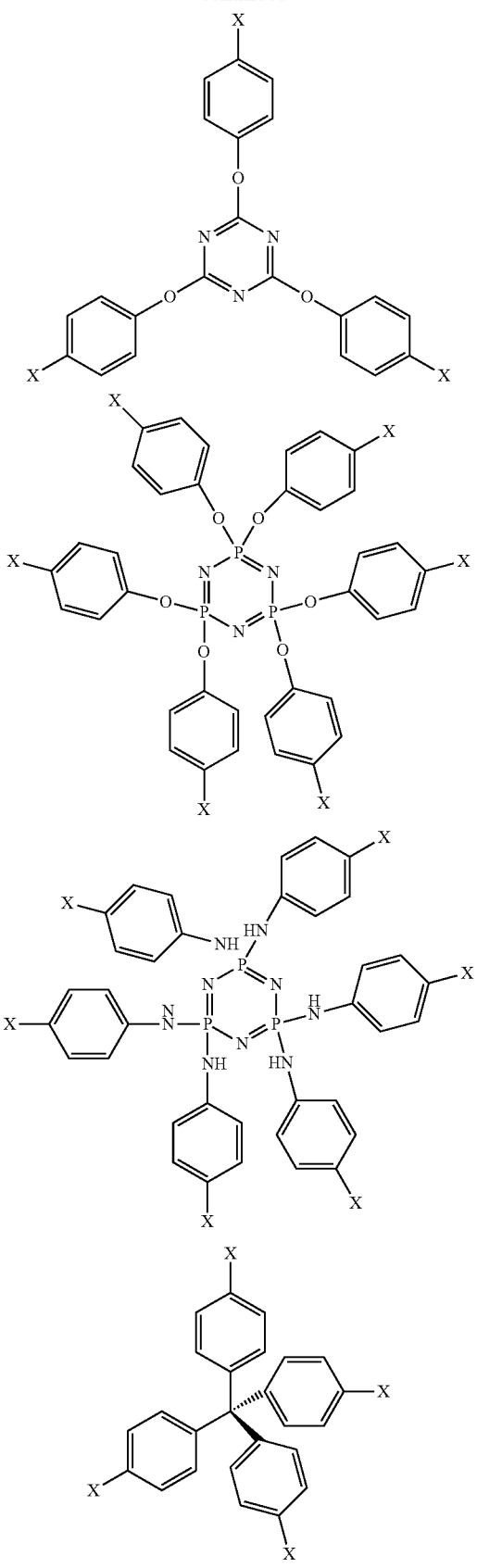
38
-continued
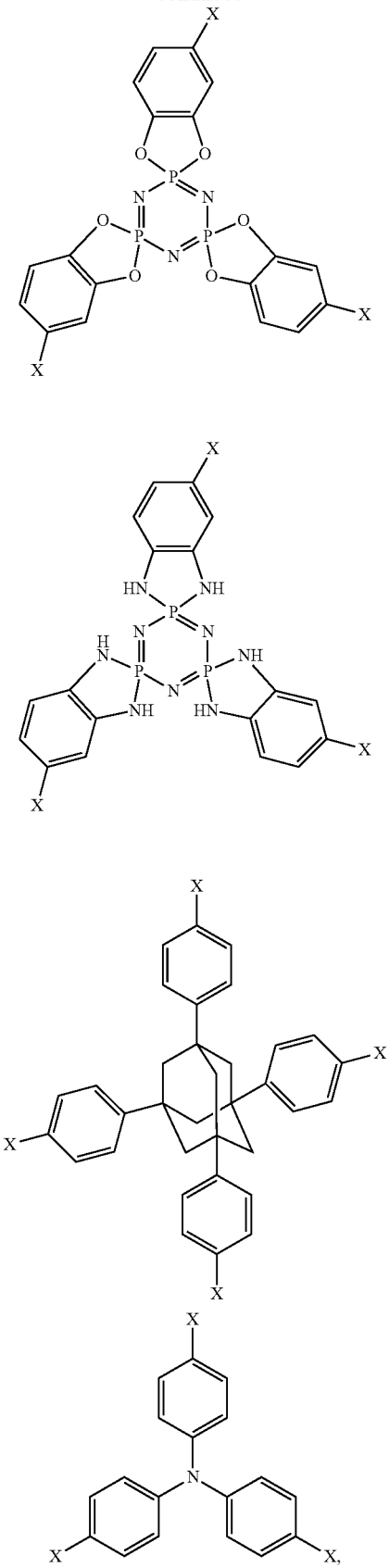

wherein each X is independently selected from

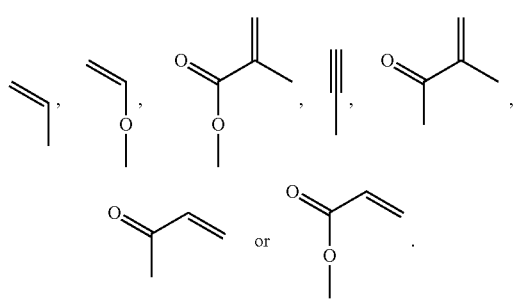

or

2. The liquid crystal display of claim 1, wherein the alignment layer compound comprises at least one compound represented by following Chemical Formula 1 and Chemical Formula 2:

(Chemical Formula 1)

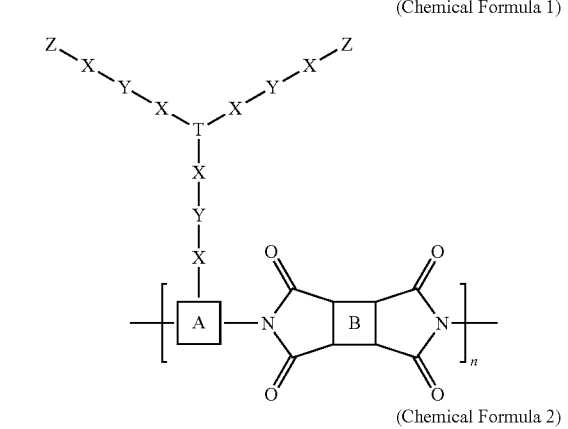

(Chemical Formula 2)

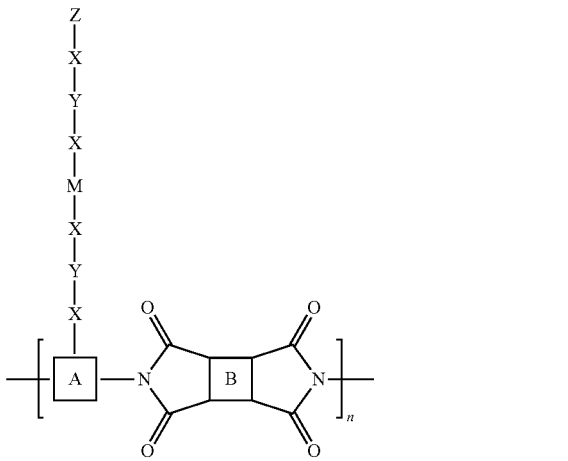

wherein:
Z represents a photoreactive group;
each Y is independently selected from

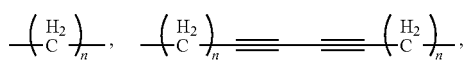

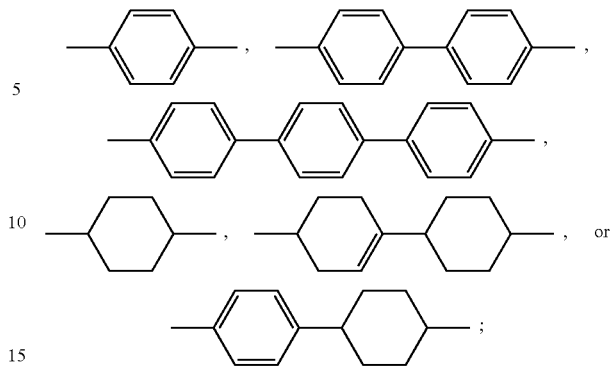

each Z is independently selected from

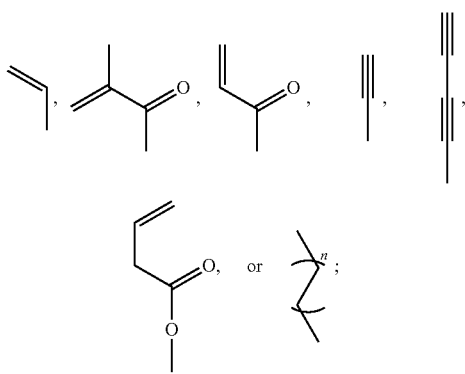

each X is independently selected from

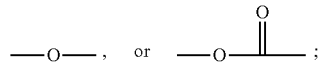

A is

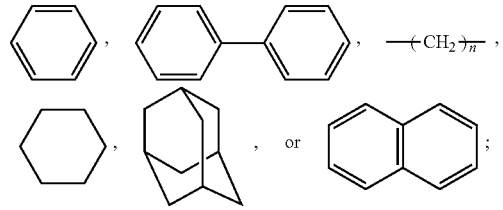

B is

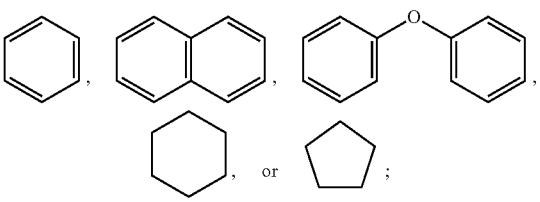

M is

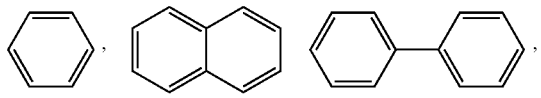

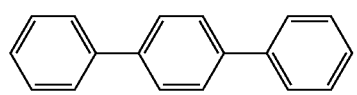

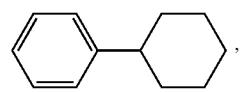

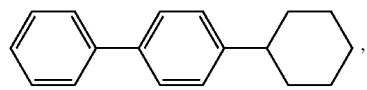

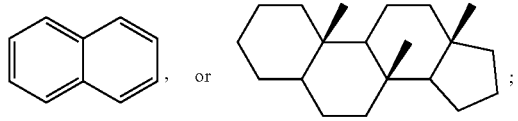

T is

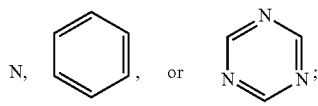 [SMILES: c1ccccc1 ; c1ncncn1]

and n is a natural number greater than or equal to 1.

3. The liquid crystal display of claim 2, wherein the alignment layer compound comprises a diamine compound and a dianhydride compound, and a mole ratio of the diamine compound to the dianhydride compound is about 1:1.

4. The liquid crystal display of claim 1, wherein a content of the additive is about 0.01% to about 50% by weight based on a total weight of the first alignment layer or the second alignment layer.

5. The liquid crystal display of claim 1, wherein the alignment layer compound comprises a compound represented by following Chemical Formula 3:

(Chemical Formula 3)

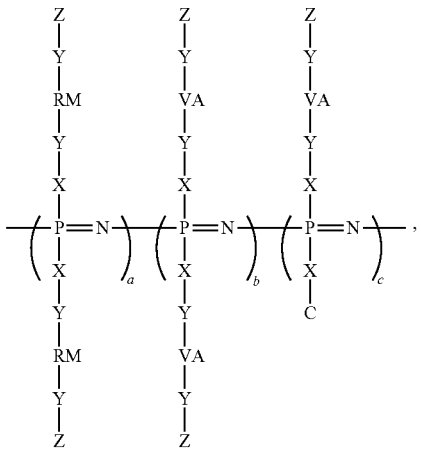

wherein:
RM represents the reactive mesogen and is selected from

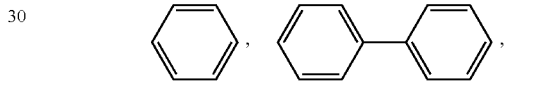

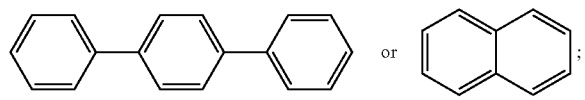

VA represents the vertical alignment group and is selected from

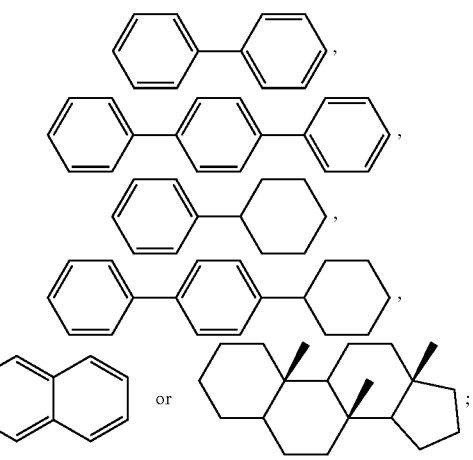

X is $-\overset{H}{\underset{|}{N}}-$, or $-O-$;

each Y is independently selected from

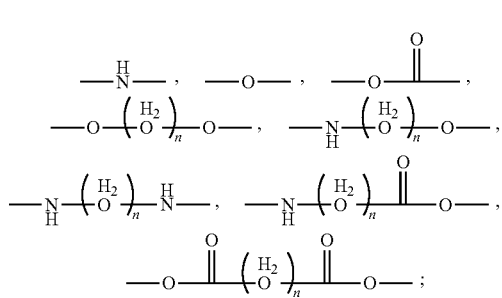

Z is

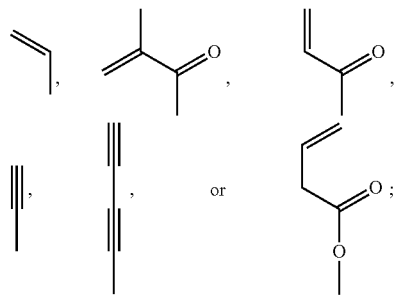

C is OH, —NH$_2$, trifluoroethyl, ethyl, propyl, t-butyl, butyl, or a saturated/unsaturated hydrocarbon substituted with a plurality of halogens;

n is a natural number greater than or equal to 1; and a, b and c each have a value of 0 to 1, and a sum of a, b and c is 1.

6. The liquid crystal display of claim 5, wherein, the alignment layer compound is a compound represented by following Chemical Formula 4:

(Chemical Formula 4)

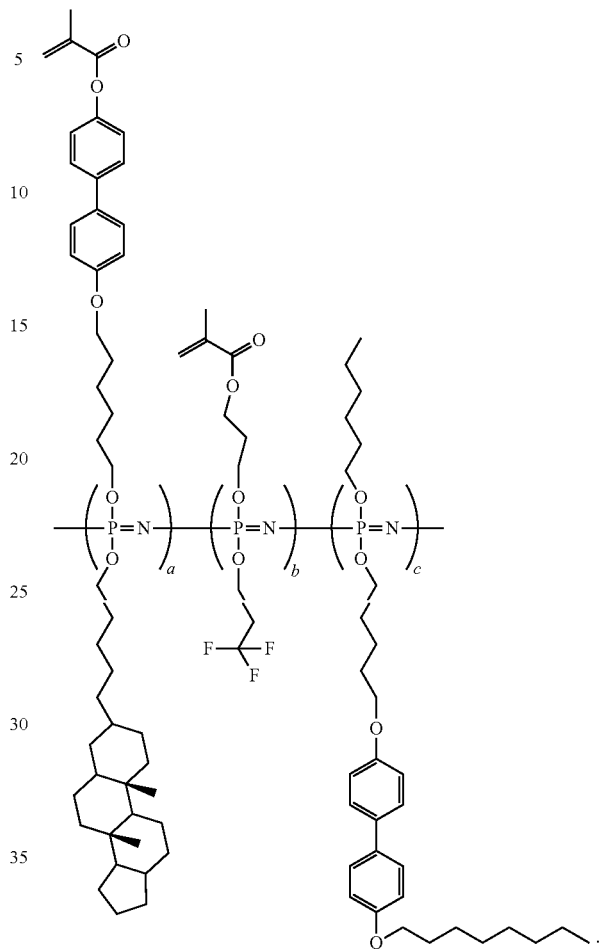

* * * * *